US010839999B2

(12) United States Patent
Cayton et al.

(10) Patent No.: US 10,839,999 B2
(45) Date of Patent: Nov. 17, 2020

(54) ELECTROMAGNETIC COIL CONNECTION ASSEMBLY

(71) Applicant: Horton, Inc., Roseville, MN (US)

(72) Inventors: Robert Donald Cayton, Würzburg (DE); Bastian Michael Horst Brand, Schonungen (DE)

(73) Assignee: Horton, Inc., Roseville, MN (US)

( * ) Notice: Subject to any disclaimer, the term of this patent is extended or adjusted under 35 U.S.C. 154(b) by 0 days.

(21) Appl. No.: 16/479,008

(22) PCT Filed: Jan. 30, 2018

(86) PCT No.: PCT/US2018/015884
§ 371 (c)(1),
(2) Date: Jul. 18, 2019

(87) PCT Pub. No.: WO2018/144428
PCT Pub. Date: Aug. 9, 2018

(65) Prior Publication Data
US 2019/0355502 A1    Nov. 21, 2019

Related U.S. Application Data

(60) Provisional application No. 62/453,230, filed on Feb. 1, 2017.

(51) Int. Cl.
*H01F 7/06* (2006.01)
*F16D 35/02* (2006.01)
(Continued)

(52) U.S. Cl.
CPC ............. *H01F 7/06* (2013.01); *F16D 35/024* (2013.01); *H01F 27/02* (2013.01); *H01F 27/2804* (2013.01); *F16D 2300/18* (2013.01)

(58) Field of Classification Search
None
See application file for complete search history.

(56) References Cited

U.S. PATENT DOCUMENTS

| 3,097,346 | A | * | 7/1963 | Horelick | ................. H01F 27/04 336/68 |
| 3,611,132 | A |   | 10/1971 | Wright et al. | |

(Continued)

FOREIGN PATENT DOCUMENTS

| CN | 104011443 A | 8/2014 |
| CN | 104641430 A | 5/2015 |

(Continued)

OTHER PUBLICATIONS

Office Action issued in corresponding Chinese Application No. 201880006915.X, dated Mar. 19, 2020.

(Continued)

*Primary Examiner* — Colby M Hansen
(74) *Attorney, Agent, or Firm* — Westman, Champlin & Koehler, P.A.

(57) ABSTRACT

An electromagnetic coil assembly (34) includes a coil sub-assembly (34C) and a tower sub-assembly (34T). The coil sub-assembly includes a coil housing (70) having a first opening (70-4A; 70-4B), a coil winding (72), a tower mount (74) having a base (74-1) adjoining the first opening and extending along a first surface (70I) of the coil housing, and a first mount bushing (76A; 76B) secured to the base. The first mount bushing is electrically connected to the coil winding. The tower sub-assembly includes a tower housing (90) positioned at a second surface of the coil housing located opposite the first surface, a first tower bushing (96A; 96B) electrically connected to the first mount bushing, and a first fastener (98A; 98B) securing the first tower bushing to the first mount bushing. The first fastener is engageable to (Continued)

the first mount bushing from proximate the second surface of the coil housing.

21 Claims, 9 Drawing Sheets

(51) Int. Cl.
*H01F 27/02* (2006.01)
*H01F 27/28* (2006.01)

(56) References Cited

U.S. PATENT DOCUMENTS

| | | |
|---|---|---|
| 4,246,995 A | 1/1981 | Gee |
| 4,355,709 A | 10/1982 | Light |
| 4,362,226 A | 12/1982 | Gee |
| 5,152,383 A | 10/1992 | Boyer et al. |
| 5,226,220 A | 7/1993 | Gevas et al. |
| 5,307,038 A * | 4/1994 | Ishimaru ............... F16D 27/112 192/84.961 |
| 5,423,117 A | 6/1995 | Okada et al. |
| 5,511,643 A | 4/1996 | Brown |
| 5,706,858 A | 1/1998 | Miyazoe |
| 6,000,966 A | 12/1999 | Dechanteloup et al. |
| 6,175,168 B1 | 1/2001 | Budd et al. |
| 6,419,064 B1 | 7/2002 | Krammer |
| 6,426,690 B1 | 7/2002 | Takenoshita et al. |
| 6,935,478 B2 | 8/2005 | Drager et al. |
| 7,191,883 B2 | 3/2007 | Angermaier |
| 7,289,012 B2 | 10/2007 | Tran-Ngoc et al. |
| 7,621,386 B2 | 11/2009 | Light |
| 7,704,507 B2 | 6/2010 | Stanhope |
| 8,754,735 B2 | 6/2014 | Piascik et al. |
| 8,860,541 B2 | 10/2014 | Piascik et al. |
| 8,893,868 B2 | 11/2014 | Kennedy |
| 9,027,228 B2 | 5/2015 | Piascik et al. |
| 9,324,488 B2 | 4/2016 | Dayton |
| 9,576,719 B2 | 2/2017 | Piascik et al. |
| 2004/0168877 A1 | 9/2004 | Drager et al. |
| 2005/0189194 A1 | 9/2005 | Lindauer et al. |
| 2005/0225418 A1 | 10/2005 | Tran-Ngoc et al. |
| 2009/0084650 A1 | 4/2009 | Hennessy et al. |
| 2009/0160589 A1 | 6/2009 | Krafft |
| 2011/0048888 A1* | 3/2011 | Kurosu ............... F16D 27/112 192/84.1 |
| 2012/0279820 A1 | 11/2012 | Hennessy et al. |
| 2014/0239210 A1 | 8/2014 | Alvarez et al. |

FOREIGN PATENT DOCUMENTS

| | | |
|---|---|---|
| DE | 4011528 A1 | 10/1991 |
| DE | 4341087 A1 | 6/1995 |
| DE | 10216731 B3 | 1/2004 |
| EP | 0068908 A1 | 1/1983 |
| EP | 0009388 A1 | 4/1988 |
| FR | 1348792 A | 1/1964 |
| JP | 2007107652 A | 4/2007 |
| JP | 2014229805 A | 12/2014 |
| WO | 2007016493 A1 | 2/2007 |
| WO | 2007016494 A1 | 2/2007 |
| WO | 2007016497 A1 | 2/2007 |
| WO | 2009030574 A1 | 3/2009 |
| WO | 2010054487 A1 | 5/2010 |
| WO | 2011062856 A2 | 5/2011 |
| WO | 2014159374 A1 | 10/2014 |
| WO | 2017004176 A1 | 1/2017 |
| WO | 2017062328 A1 | 4/2017 |
| WO | 2018004833 A1 | 1/2018 |

OTHER PUBLICATIONS

International Search Report and Written Opinion issued in International Application No. PCT/US2018/015884, dated May 15, 2018.

* cited by examiner

ELECTROMAGNETIC COIL CONNECTION ASSEMBLY

FIELD

The present invention relates to electromagnetic coil assemblies and associated methods of fabrication.

BACKGROUND

Viscous clutches are used in a wide variety of applications, such as for automotive fan drive applications and other vocational and industrial applications. These clutches typically employ relatively thick silicone oil (more generally called shear fluid or viscous fluid) for the selective transmission of torque between two rotatable components. Engagement and disengagement the clutch is made possible by selectively allowing the oil into and out of a working area of the clutch located between input and output members (e.g., between a rotor and a housing), where a viscous shear coupling can be created by the oil to transmit torque from the input member to the output member. Output speed of the clutch can be controllably varied between approximately 0% and approximately 100% of input speed, as a function of the volume of the shear fluid present in the working area. A valve is used to control the flow of the oil into and/or out of the working area. Operation of the valve can be controlled by way of magnetic flux generated by an electromagnetic coil (or solenoid) and transmitted along a magnetic flux circuit that links the valve and the coil. In this way, output torque can be modulated over time to suit operating conditions. Control circuitry is provided to help regulate operation of the clutch, including the electromagnetic coil and the valve assembly, as a function of desired operating parameters.

Additionally, viscous clutches can include a Hall effect sensor, or other suitable sensor. Such a sensor can be used to measure clutch output speed, to facilitate control of the valve by the control circuitry. It is necessary to provide power to the sensor, as well as to allow for signal transmission from the sensor to control circuitry located remotely from the sensor. Such sensors sometimes protrude from the clutch, which can undesirably increase an overall size of the clutch package.

Although many parts of the clutch assembly rotate during operation (i.e., are rotatable), the electromagnetic coil is typically rotationally fixed. In general, use of a fixed coil avoids wear and reliability issues often associated with the use of slip rings, brushes or similar mechanisms to transmit electrical power across a rotational connection to a rotating coil. For clutches with a stationary mounting shaft, it may be possible to affix the electromagnetic coil to the stationary shaft (see, e.g., PCT Patent Application Publication WO2011/062856). Yet in some applications a stationary shaft is not available or desired, or a given clutch design may have a magnetic flux circuit that requires the electromagnetic coil to be located away from the stationary shaft. For these other clutches, such as those with a rotatable (or "live") shaft that can function as a rotational input to the clutch, rotationally fixing the electromagnetic coil must generally be accomplished in another way, such as by using a tether, strap or other rotational fixing mechanism. Use of a rotationally fixed electromagnetic coil also often requires use of coil support bearings, as well as both mechanical and electrical attachments that are durable enough for automotive applications and the like.

Fabrication/assembly of electromagnetic coil assemblies can be difficult, requiring a number of electrical and mechanical attachments. Labor-intensive soldering and part-insertion steps can prolong the fabrication/assembly process.

In automotive clutch applications, for instance, electrical and mechanical attachments also must be durable to reliably perform through potentially harsh conditions, including severe vibration, inclement weather and the like. Coil assemblies used with fan clutches may be subjected to airflows generated by a fan, which can contribute to vibration and other stresses. Loosening, degradation or corrosion of electromagnetic coil assembly components could lead to undesirable failures caused by part liberation, loss of power or sensor signals, short circuits, etc.

Moreover, an overall clutch package should be relatively compact and low in mass.

It is therefore desired to provide an alternative electromagnetic coil assembly suitable for use with clutches, such as viscous clutches.

SUMMARY

In one aspect, an electromagnetic coil assembly includes a coil sub-assembly and a tower sub-assembly. The coil subassembly includes a coil housing having a first opening and made of a magnetic flux conducting material, a coil winding having multiple turns positioned adjacent to the coil housing, a tower mount having a base adjoining the first opening and extending along a first surface of the coil housing, and a first mount bushing secured to the base, the first mount bushing made of an electrically conductive material. The first mount bushing is electrically isolated from the coil housing, and is electrically connected to the coil winding. The tower sub-assembly includes a tower housing positioned at a second surface of the coil housing, a first tower bushing electrically connected to the first mount bushing, and a first fastener securing the first tower bushing to the first mount bushing. The second surface is located opposite the first surface. The first fastener is engageable to the first mount bushing from proximate the second surface of the coil housing.

In another aspect, an electromagnetic coil assembly according to the present invention includes a coil sub-assembly and a tower sub-assembly. The coil sub-assembly includes a coil housing having a cavity and a first opening, a coil winding having multiple turns positioned within the cavity of the coil housing, a tower mount having a base positioned in the cavity adjoining the first opening and extending along an interior surface of the coil housing, and a first mount bushing secured to the base. The first mount bushing can be made of an electrically conductive material, and can be electrically isolated from the coil housing. The first mount bushing is electrically connected to the coil winding. The coil housing is made of a magnetic flux conducting material. The tower sub-assembly includes a tower housing positioned at an exterior of the coil housing, a first tower bushing electrically connected to the first mount bushing, and a first fastener securing the first tower bushing to the first mount bushing. The first fastener is engageable to the first mount bushing from the exterior of the coil housing.

In another aspect, a method according to the present invention includes positioning turns of a coil winding in a cavity of a coil housing, positioning a base of a tower mount within the cavity of the coil housing such that the base is in between the turns of the coil winding and a wall of the coil housing, aligning a mount terminal with an opening in the wall of the coil housing, with the mount terminal secured to the base, electrically connecting the mount terminal to the coil winding, positioning a tower housing carrying a tower terminal at an opposite side of the wall of the coil housing from the base of the tower mount, and connecting the tower terminal to the mount terminal with a fastener. Connecting the fastener provides both a structural mechanical connection and an electrical connection through the opening in the wall of the coil housing.

In yet another aspect, an electromagnetic coil assembly according to the present invention includes a coil sub-assembly and a tower sub-assembly removably connected to the coil sub-assembly. The coil sub-assembly includes a coil housing having a cup-shaped wall that defines a cavity inside the coil housing and having an opening that extends through the wall, a coil winding having multiple turns positioned within the cavity of the coil housing, a tower mount having a base and a boss, and a mount terminal secured to the base. The mount terminal is electrically isolated from the coil housing by the boss, and the mount terminal is electrically connected to the coil winding. The base is positioned in the cavity adjoining the opening and extending along an interior surface of the wall of the coil housing, with the boss protruding from the base and through the opening. The wall of the coil housing is made of a magnetic flux conducting material, and the mount terminal is made of an electrically conductive material. The tower sub-assembly includes a tower housing positioned at an exterior of the coil housing and extending along an exterior surface of the wall of the coil housing, a tower terminal electrically connected to the mount terminal, and a fastener securing the coil sub-assembly to the tower sub-assembly. The fastener clamps the wall of the coil housing between the tower housing and the base of the tower mount, and creates an electrical connection between the tower terminal and the mount terminal.

In another aspect, a method includes positioning a base of a tower mount at a first side of a coil pole such that turns of a coil winding are located adjacent to the coil pole, aligning a mount terminal with an opening in the coil pole such that the mount terminal is secured to the base and the mount terminal is electrically connected to the coil winding, positioning a tower housing at a second side of the coil pole, and connecting a tower terminal to the mount terminal with a fastener such that connecting the fastener provides both a structural mechanical connection and an electrical connection through the opening in the coil pole. The second side is located opposite the first side, and the tower housing carries the tower terminal.

In another aspect, an electromagnetic coil assembly includes a coil winding forming multiple turns, a molded base having an annular shape and being positioned adjacent to the coil winding, a mount bushing made of an electrically conductive material and secured to the molded base, a tower housing positioned adjacent to the molded base, a tower bushing secured to the tower housing, and a fastener electrically connecting the tower bushing to the mount bushing, such that the fastener further mechanically secures the tower housing to the molded base. The coil winding is electrically connected to the base bushing.

In yet another aspect, a method of making an electromagnetic coil assembly includes securing a mount bushing to a base made of a polymer material, positioning the base adjacent to turns of a coil winding, electrically connecting the coil winding to the mount bushing, securing an electrically conductive tower bushing to a tower housing, positioning a tower housing adjacent to a radially outward facing surface of the base, and connecting the tower bushing to the mount bushing with a fastener. The base has an annular shape, and wherein the mount bushing is electrically conductive. Connecting the fastener creates both (a) a structural mechanical connection that supports the tower housing on the base and (b) an electrical connection between the mount bushing and the tower bushing.

The present summary is provided only by way of example, and not limitation. Other aspects of the present invention will be appreciated in view of the entirety of the present disclosure, including the entire text, claims and accompanying figures.

Figure 1:
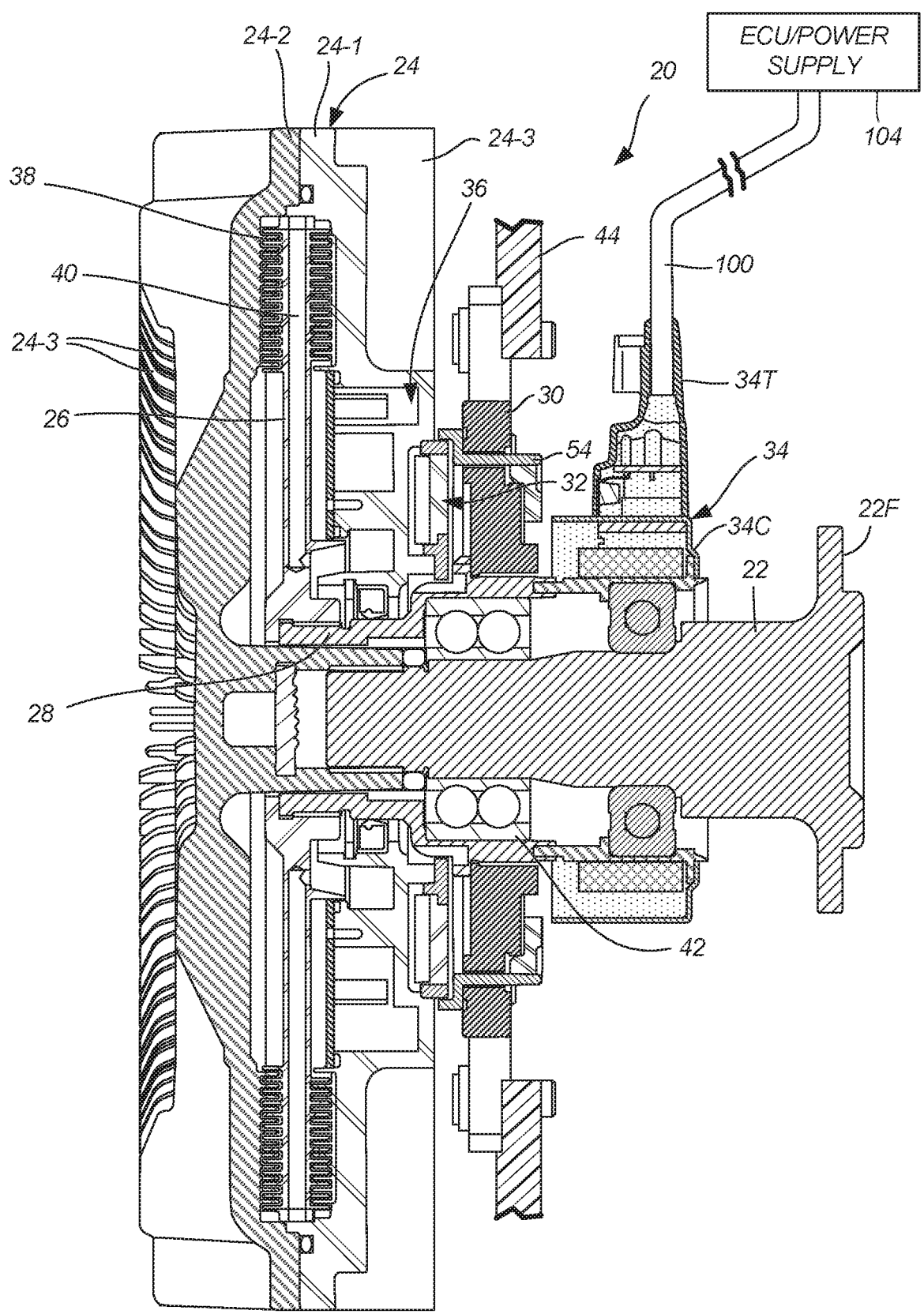
FIG. 1 is a cross-sectional view of a viscous clutch and electromagnetic coil assembly according to an embodiment of the present invention.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF ILLUSTRATIVE EMBODIMENTS

In general, the present invention provides an electromagnetic coil assembly and an associated method that facilitates fabrication and assembly, such as for an automotive clutch application, and also promotes a relatively compact and low-mass overall package. More particularly, the electromagnetic coil assembly is configured to connect a coil winding with a printed circuit board (PCB) and/or other suitable control circuitry, and a cable supplying power. The PCB can be contained in a housing adjacent to mechanical and/or electrical connections, to provide a compact assembly that helps to protect the sensitive PCB. The housing can have a multi-piece construction, allowing different subassemblies to be fabricated and then later assembled together in a convenient manner. Embodiments of the invention also allow fasteners and bushings of the assembly to function as both electrical and structural mechanical connections. For instance, in one example embodiment, electrically conductive bushings on respective subassemblies can be connected together by a fastener (which also can be electrically conductive) to create an electrically connection through those bushings. Thus, by allowing certain components to be integrated together, while still maintain the ability to fabricate multiple sub-assemblies, an electromagnetic coil assembly (and overall clutch package) can be provided that is relative compact, relatively low mass, and relatively easy to assemble. Other features and benefits of the present invention will be appreciated by those of ordinary skill in the art in view of the entirety of the present disclosure, including the accompanying figures.

The present application claims priority to U.S. Provisional Application Ser. No. 62/453,230 filed Feb. 1, 2017, which is hereby incorporated by reference in its entirety.

FIG. 1 is a cross-sectional view of an embodiment of a viscous clutch 20 that includes a shaft 22, a multi-part housing (or housing assembly) 24, a rotor 26, a hub 28, a mounting disk 30, a valve assembly 32 (only partly visible in FIG. 1), an electromagnetic coil assembly 34, a reservoir 36, and a working chamber 38. The illustrated embodiment of the viscous clutch 20 includes aspects that resemble those of the clutch disclosed in PCT Patent Application Publication WO2017/062328, entitled "Live Center Viscous Clutch." However, it should be noted that the present invention can be utilized with nearly any other type of viscous clutch in further embodiments, and the illustrated embodiment is shown merely by way of example and not limitation. For instance, viscous clutches with a fixed (i.e., non-rotating) shaft are possible, as well as alternate configurations of a fluid circuit of the clutch, for example.

In the illustrated embodiment, the shaft 22 is a "live" center shaft, meaning that the shaft 22 is rotatable and is located at a center of the clutch 20 defined by an axis of rotation. The shaft 22 can accept a torque input to the clutch 20 from a prime mover (not shown), such as an internal combustion engine. The shaft 22 is rotatably fixed to the housing 24 at or near a front face of the housing 24. The shaft 22 can act as a primary structural support for the entire clutch 20, which is to say that mass of the clutch 20 can be supported primarily (or entirely) by the shaft 22. In the illustrated embodiment, the shaft 22 includes a flange 22F at a rear end that is integrally and monolithically formed with a remainder of the shaft 22.

The housing 24 of the illustrated embodiment includes a base 24-1 and a cover 24-2 secured to each other in a rotationally fixed manner. The housing 24 can be made of aluminum or another suitable material. Cooling fins 24-3 can be provided on external surfaces of the housing 24, on the base 24-1 and/or the cover 24-2, to facilitate heat dissipation to ambient air. Because the housing 24 is rotationally fixed to the shaft 22, the housing 24 rotates whenever the shaft 22 rotates. When the shaft 22 accepts torque input to the clutch 20, the housing 24 acts as an input member and rotates at an input speed as a function of a torque input to the shaft 22, with both the housing 24 and the shaft 22 rotating whenever there is torque input to the clutch 20.

The rotor 26 is positioned at least partially within the housing 24, and preferably entirely within the housing 24, and can have a disc-like shape. The rotor 26 can be made of aluminum or another suitable material. When the shaft 22 and the housing 24 act as input members of the clutch 20, the rotor 26 (together with the hub 28 and the mounting disk 30) acts as an output member.

The working chamber 38 is defined (and operatively positioned) between the rotor 26 and the housing 24. The working chamber 38 can extend to both sides of the rotor 26. As known in the art, selective introduction of a shear fluid to the working chamber 38 can engage the clutch 20 by creating a viscous shear coupling to transmit torque between the housing 24 and rotor 26, with the degree of torque transmission (and associated output slip speed) being variable a function of the volume of shear fluid present in the working chamber 38. Concentric annular ribs, grooves and/or other suitable structures can be provided on the rotor 26 and housing 24 to increase surface area along the working chamber 38 and promote a shear coupling when the shear fluid is present in the working chamber 38, as is known in the art. The rotor 26 can further include a fluid return bore 40 that extends generally radially from the working chamber 38 to the reservoir 36, though it should be noted that in alternate embodiments the fluid return bore 40 can be located in the housing 24, or otherwise have a different configuration than shown in FIG. 1.

The hub 28 is a generally axially-extending, sleeve-like member that can serve multiple functions, including providing structural support for various clutch components, a torque transmission path, and part of a magnetic flux circuit. The rotor 26 is rotationally fixed to the hub 28, and the hub 28 is further rotationally fixed to the mounting disk 30, which, together with the rotor 26 and the hub 28, can act as an output of the clutch 20. The hub 28 can be rotationally supported on the shaft 22 by a bearing set 42. It should be noted that the particular configuration of the hub 28 shown in the drawings and described above is provided merely by way of example, and not limitation. For instance, a portion of the hub 30 could be integrated with the rotor 26 or have a different (e.g., non-stepped) shape in further embodiments, and an additional bearing set can optionally be provided proximate to the rotor 26. Moreover, alternative embodiments of the clutch 20 may omit the hub 28 entirely. The hub 28 can be made of a suitable magnetic flux-conducting material, such as a ferromagnetic material like steel, in order to serve as part of a flux circuit that links the coil assembly 34 and the valve assembly 32.

The mounting disk 30 is rotationally fixed to the hub 28, which provides a rotational coupling between the rotor 26 and the mounting disk 30, enabling the mounting disk 30 to co-rotate at the same speed as the rotor 26 (e.g., at the output slip speed). An output device 44, such as a fan, can be connected and rotationally fixed to the mounting disk 30, so as to accept a torque output of the clutch 20. The mounting disk 30 can be positioned at or near a rear face of the housing 24, and at least a portion of the mounting disk 30 extends outside the housing 24. The illustrated configuration of the mounting disk 30 is shown merely by way of example, and other configurations are possible in further embodiments. Moreover, the mounting disk 30 can be omitted entirely in some alternative embodiments, and the output device 44 can be secured to a different portion of the clutch 20 that serves as an output member.

The output (e.g., the rotor 26, the hub 28 and the mounting disk 30) of the clutch 20 can be selectively engaged relative to the input (e.g., the shaft 22 and the housing 24) at a desired slip speed by controlling the volume of the shear fluid present in the working chamber 38 using the valve assembly 32, which can be controlled by selectively energizing the electromagnetic coil assembly 34. In the illustrated embodiment, the valve assembly 32 is mounted to the housing 24, and, more specifically, the base 24-1. The valve assembly 32 can include a valve element, an armature, and the like, for instance, in a configuration like that described in PCT Patent Application Publication WO2017/062328. A variety of translating, pivoting and rotating valve configurations are known for use with viscous clutches, and nearly any suitable electromagnetically-controlled valve assembly configuration can be implemented as desired for a particular application.

As already noted, the valve assembly 32 selectively controls flow of the shear fluid between the reservoir 36 and the working chamber 38. The reservoir 36 can be provided on or within the housing 24, and more particularly in the base 24-1 of the housing 24. The shear fluid can be stored in the reservoir 36 when not needed for engagement of the clutch 20. In the illustrated embodiment, the reservoir 36 is carried by the housing 24, such that the reservoir 36 and shear fluid contained within both rotate with the housing 24. In this way, when the shaft 22 and the housing 24 acts as an input to the clutch 20, the reservoir 36 rotates at input speed whenever there is a torque input to the clutch 20, which imparts kinetic energy to the shear fluid in the housing-carried reservoir 36 to facilitate relatively quick clutch engagement response times. However, in alternative embodiments, the reservoir 36 can be located elsewhere in the clutch 20, such as being carried by the rotor 26.

A fluid circuit of the clutch 20 provides a fluid delivery path that extends from the reservoir 36 to the working chamber 38, and a fluid return path that extends from the working chamber 38 back to the reservoir 36. The fluid return path includes the return bore 40. It should be noted that the illustrated fluid circuit arrangement is shown in FIG. 1 merely by way of example and not limitation, and other configurations are possible in alternative embodiments. In the illustrated embodiment, the valve assembly 32 regulates flow of the shear fluid from the reservoir 36 to the working chamber 38 along the fluid delivery path, and a pump element along the working chamber 38 continually pumps the shear fluid back to the reservoir 36 along the fluid return path when there is a torque input to the clutch 20, in a manner known in the art. In further embodiments, the valve assembly 32 can be positioned to additionally or alternatively regulate flow of the shear fluid from the working chamber 38 to the reservoir 36 along the return path.

In the illustrated embodiment, the electromagnetic coil assembly 34 is rotatably mounted on the shaft 22 by a bearing set 50, at a location outside of and rearward of the housing 24. The electromagnetic coil assembly 34 can be rotationally fixed, and the bearing set 50 can allow the shaft 22 and other components of the clutch 20 to rotate while the electromagnetic coil assembly 34 remains rotationally stationary. The bearing set 50 can be considered a part of the electromagnetic coil assembly 34. A tether, strap, bracket or other suitable device (not shown) can be used to rotationally fix the electromagnetic coil assembly 34 relative to a mounting location of the clutch 20, in a manner known in the art. As shown in FIG. 1, inner diameters of the bearing set 50 and a bearing pilot of a coil housing that accepts an outer race of the bearing set 50 are each smaller than an outer diameter of the flange 22F at the rear end of the shaft 22. The electromagnetic coil assembly 34 therefore cannot pass over the flange 22F, and cannot be installed or removed from the rear end of the shaft 22. Moreover, the housing 24 (and rotor 26, mounting disk 30, etc.) is located on or near a front end of the shaft 22, and is much larger than the electromagnetic coil assembly 22 in the radial direction. This means that the electromagnetic coil assembly 34 is "trapped" between the flange 22F and the housing 24, and can only be installed on or removed from the shaft 22 from the front end when the housing 24 and related components are absent (e.g., either before the housing 24 and related components are installed on the shaft 22, or after those components have been removed from the shaft 22). Increasing a diameter of the electromagnetic coil assembly 34 is generally undesirable, because such a larger diameter tends to undesirably increase the mass of the electromagnetic coil assembly 34 and can also increase power requirements to operate the coil assembly 34. Moreover, certain applications may require the presence of the flange 22F in order to accept a torque input, and it may be difficult if not impossible to make the flange 22F separable from the remainder of the shaft 22 due to the relatively inaccessible nature of the rear end of the shaft 22 in an installation. For these reasons, prior art coil assemblies tended to need to be installed on the shaft 22 before the housing 24 and related components were installed on the shaft 22, and removable of those coil assemblies required first removing the housing 24 and related components from the shaft 22. However, prior art coil assemblies tend to have long wires and/or cables that are cumbersome when completing fabrication of the clutch 20, and any damage to such wires and/or cables required removal of the housing 24 and related components from the shaft 22 in order to completely replace the entire prior art coil assembly (even if only the wires and/or cables were damaged). The illustrated embodiment of the electromagnetic coil assembly 34 therefore provides a multi-part construction that allows one or more sub-assemblies to be mounted on the shaft 22 before the housing 24 and related components are mounted on the shaft 22, while one or more additional sub-assemblies can be connected to complete the installation of the electromagnetic coil assembly 34 at a later time. Various features of the electromagnetic coil assembly 34 are discussed further below.

Figure 2:
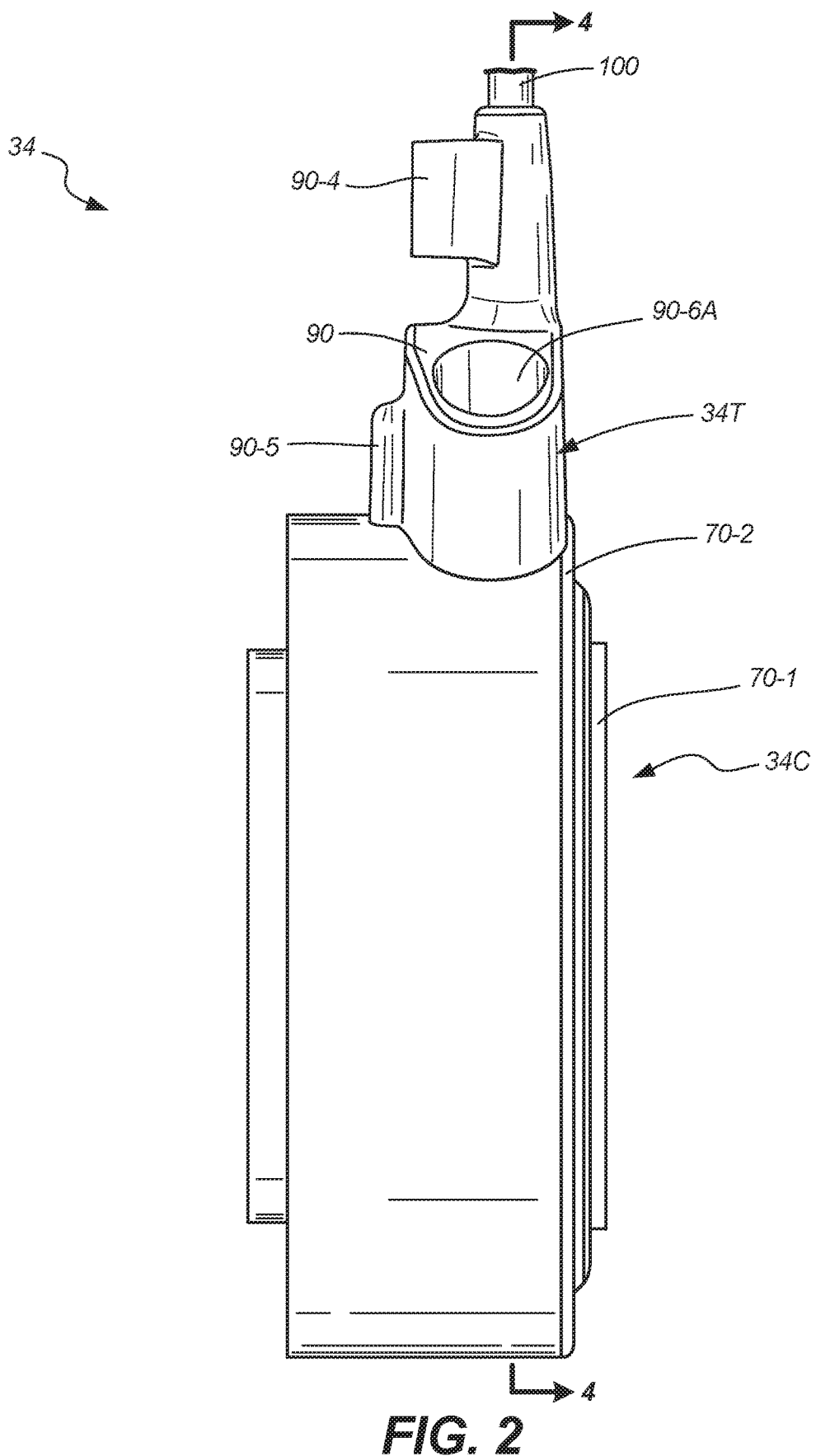
FIG. 2 is a side elevation view of the electromagnetic coil assembly, shown in isolation.
Figure 3:
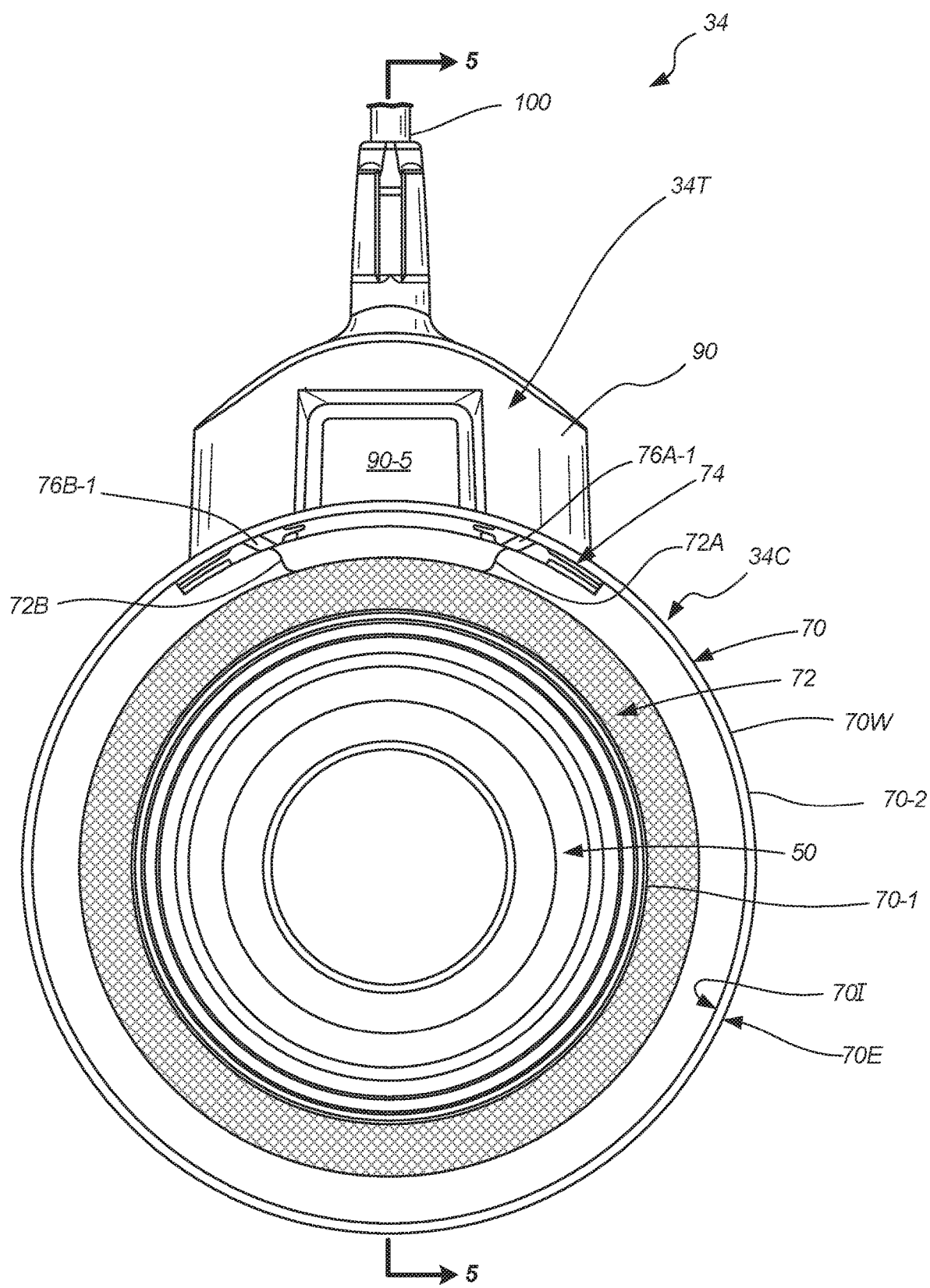
FIG. 3 is a front elevation view of the electromagnetic coil assembly, shown in isolation.
Figure 4:
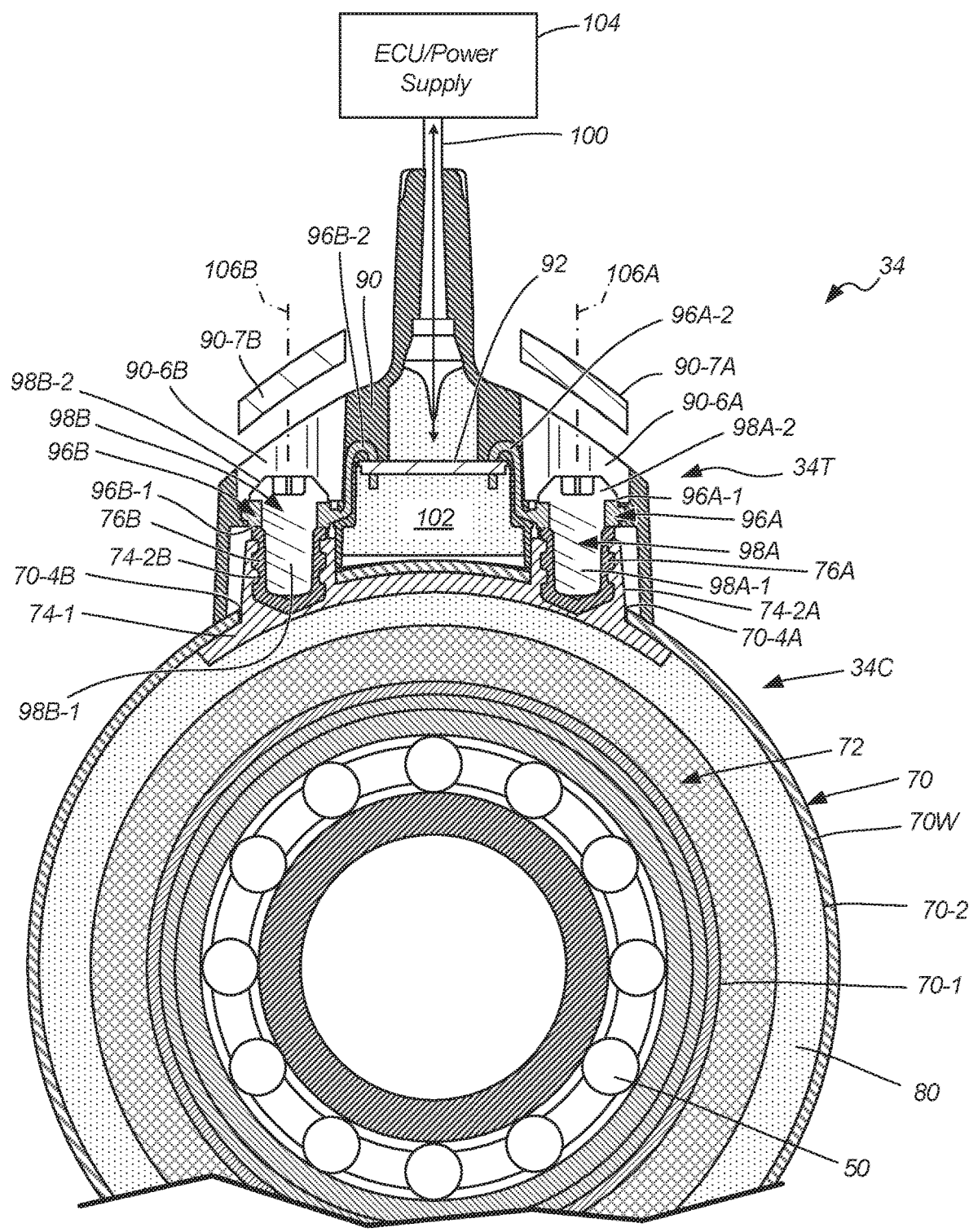
FIG. 4 is a partially-exploded cross-sectional view of the electromagnetic coil assembly, taken along line 4-4 of FIG. 2.
Figure 5:
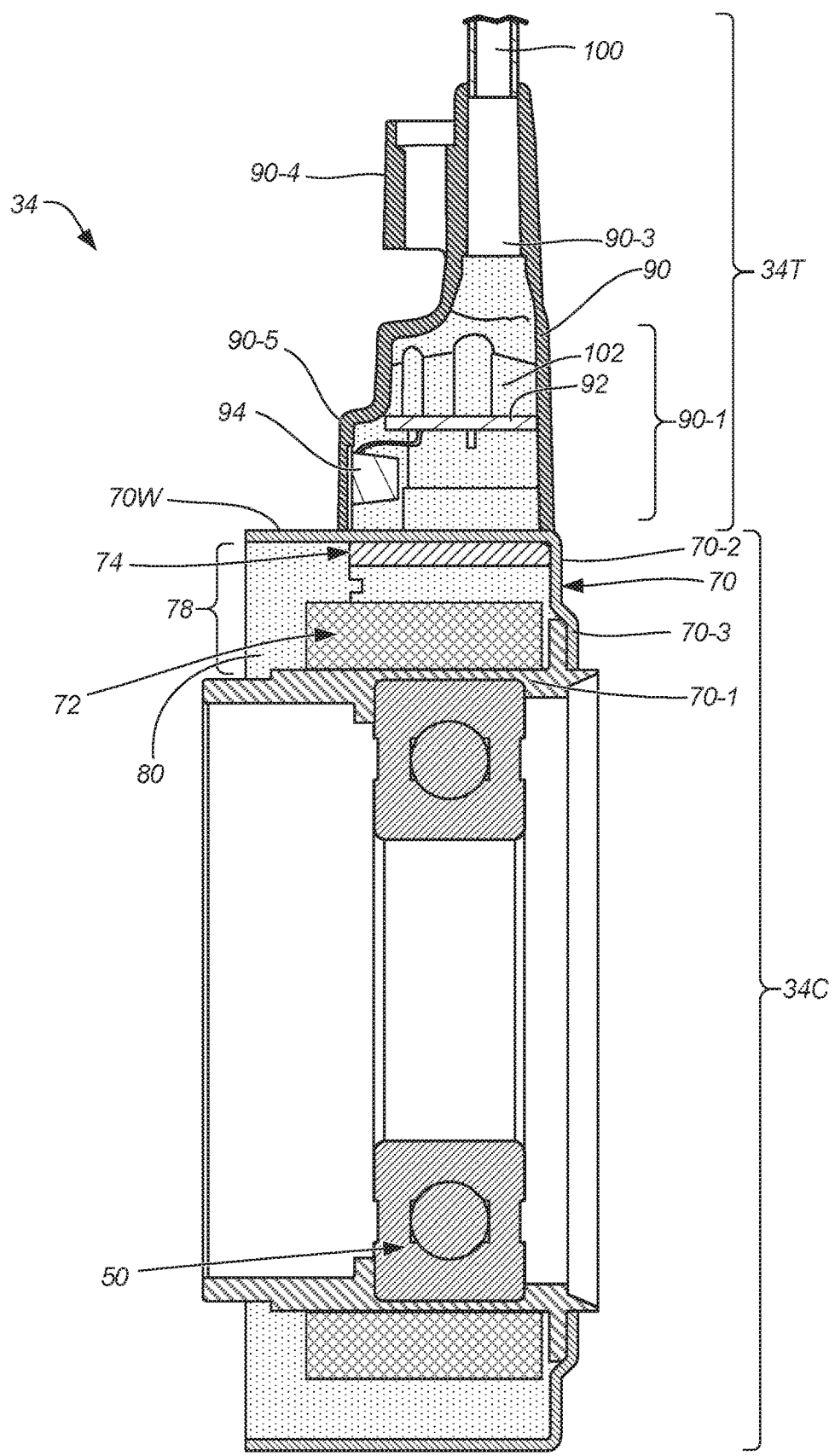
FIG. 5 is a cross-sectional view of the electromagnetic coil assembly, taken along line 5-5 of FIG. 3.
Figure 6:
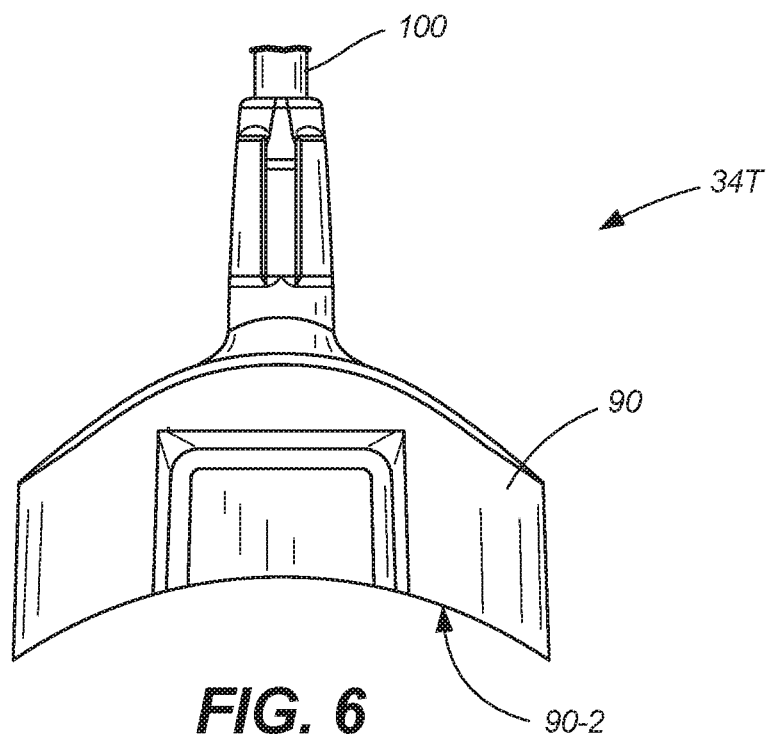
FIG. 6 is a front elevation view of a tower sub-assembly of the electromagnetic coil assembly, shown in isolation.
Figure 7:
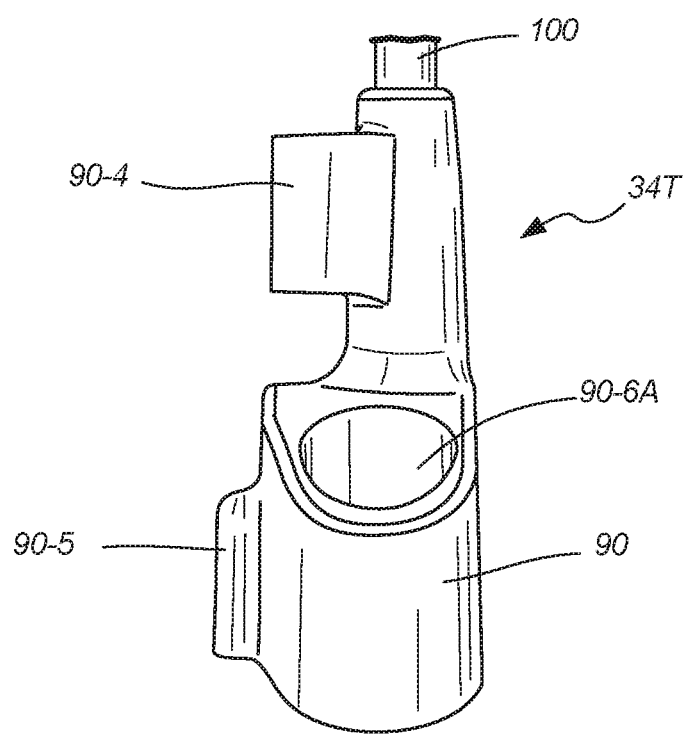
FIG. 7 is a side elevation view of the tower sub-assembly, shown in isolation.
Figure 8:
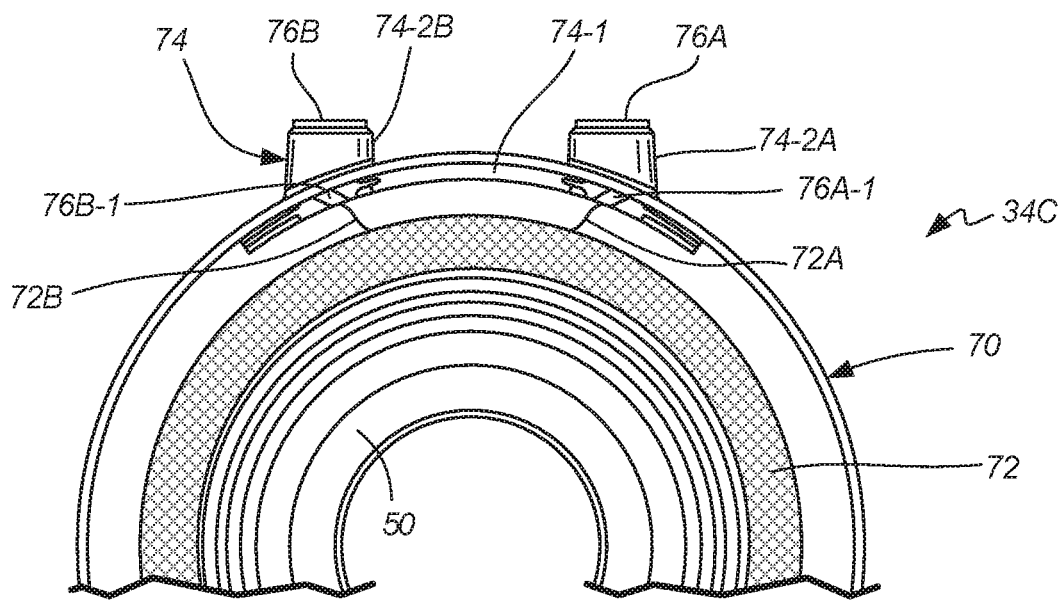
FIG. 8 is a partial front elevation view of a coil sub-assembly of the electromagnetic coil assembly, shown in isolation.
Figure 9:
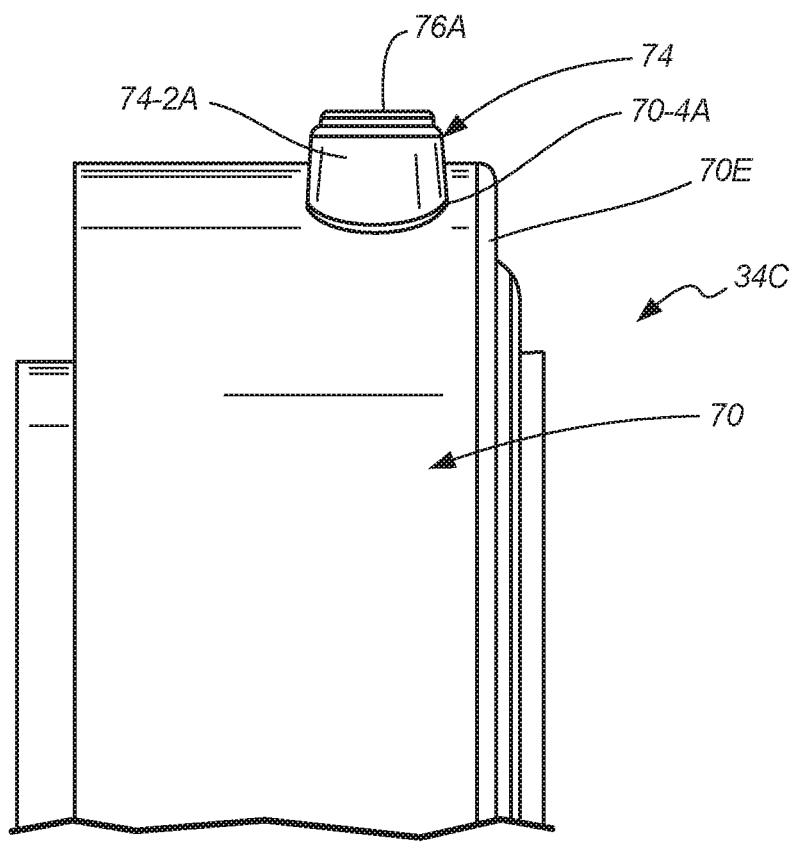
FIG. 9 is a partial side elevation view of the coil sub-assembly, shown in isolation.

FIGS. 2-5 are various views of the electromagnetic coil assembly 34, shown in isolation. FIG. 2 is a side elevation view; FIG. 3 is a front elevation view; FIG. 4 is a partially-exploded cross-sectional view, taken along line 4-4 of FIG. 2; and FIG. 5 is a cross-sectional view, taken along line 5-5 of FIG. 3. The electromagnetic coil assembly 34 includes a coil sub-assembly 34C and separable a tower sub-assembly 24T, which are each shown in isolation in FIGS. 6-9. FIG. 6 is a front elevation view of the tower sub-assembly 34T, and FIG. 7 is a side elevation view of the tower sub-assembly 34T. FIG. 8 is a partial front elevation view of the coil sub-assembly 34C, and FIG. 9 is a partial side elevation view of the coil sub-assembly 34C.

As shown in FIGS. 4 and 8, for instance, the coil sub-assembly 34C can include a coil housing 70, a coil winding 72, a tower mount 74 having one or more mount terminals (e.g., bushings) 76A and 76B, and the bearing set 50.

The coil housing 70 can have an overall cup-like shape defined by a wall 70W made of a magnetic flux conductive material, such as a ferromagnetic material like steel. The wall 70W has an exterior surface 70E and an interior surface 70I. The wall 70W, or at least the exterior surface 70E, can be uncoated or unencapsulated, in some embodiments. In the illustrated embodiment, the wall 70W of the coil housing 70 includes an inner pole 70-1 and an outer pole 70-2 that are secured together, although, in alternate embodiments, the wall 70W can instead be a single integral and monolithic element. In still further embodiments, the coil housing 70 can include additional pieces or structures, such as a supporting flange and/or multiple layers (e.g., an outer coil housing surrounding an inner coil housing). In the embodiment shown in FIG. 5, the inner pole 70-1 as illustrated has a ring-shaped (e.g., substantially cylindrical) axially extending portion 70-1A and a radially outwardly extending portion 70-1R. The outer pole 70-2 has a ring-shaped (e.g., substantially cylindrical) axially extending portion 70-2A and a radially inwardly extending portion 70-2R. The respective radially extending portions 70-1R and 70-2R of the inner and outer poles 70-1 and 70-2 are secured to each other, such as with a shiplap joint 70-3 as shown in the illustrated embodiment (see FIG. 5). The respective axially extending portions 70-1A and 70-2A of the inner and outer poles 70-1 and 70-2 are radially spaced from each other such that the wall 70W defines an interior cavity 78. At least a portion of the coil winding 72 is positioned within the coil housing 70. The axially-extending portion 70-1A of the inner pole 70-1 can form a bearing pilot to accept the outer race of the bearing set 50. The coil winding 72 has multiple turns positioned within the interior cavity 78. The cup-like shape of the coil housing 70 can provide an open face, which allows insertion of the coil winding 72 and the tower mount 74.

The coil winding 72 can be encapsulated (e.g., potted) within the interior cavity 78 of the coil housing 70 using suitable encapsulation material 80 (e.g., potting material). Throughout the figures, coil winding 72 is shown schematically with crisscross hatching, even when not represented in a sectional view. The encapsulation material 80 helps to protect the coil winding 72. The encapsulation material 80 can also help hold the tower mount 74 in position relative to the coil housing 70 during and after fabrication of the coil subassembly 34C, an in particular before the coil sub-assembly 34C is engaged with the tower sub-assembly 34T. For simplicity, and to better reveal otherwise hidden structures, the encapsulation material 80 is not shown in FIGS. 3, 5 and 8.

Additionally, one or more openings 70-4A and 70-4B are provided through the wall 70W of the coil housing 70. In the illustrated embodiment, the two openings 70-4A and 70-4B each have a circular perimeter and each pass through the axially-extending portion 70-2A of the outer pole 70-2 at locations circumferentially spaced from each other. The openings 70-4A and 70-4B can pass nearly radially through the wall 70W. In the illustrated embodiment, the openings 70-4A and 70-4B extend through the wall 70W parallel to one another, and parallel to a radial line (but not strictly in a radial direction). Moreover, in the illustrated embodiment the openings 70-4A and 70-4B are positioned closer to the radially-extending portions 70-1R and 70-2R than the open face of the coil housing 70.

The tower mount 74 can include a base 74-1 and one or more bosses 74-2A and 74-2B that protrude from the base 74-1. The base 74-1 generally has a shape configured to complement a shape of the interior surface 70I of the wall 70W of the coil housing 70. In the illustrated embodiment, the base portion 74-1 has a curved shape, resembling a portion of a cylindrical surface, and the bosses 74-2A and 74-2B are each generally cylindrical structures that protrude outward relative to the curvature of the base 74-1. During fabrication, the tower mount 74 is positioned relative to the coil housing 70 such that the base 74-1 is positioned in the cavity 78 adjoining the openings 70-4A and 70-4B and such that the base 74-1 extends along the interior surface 70I of the wall 70W of the coil housing 70. The bosses 74-2A and 74-2B can each pass into or through a corresponding one of the openings 70-4A and 70-4B in the coil housing 70. The base 74-1 and the bosses 74-2A and 74-2B can each be made of an electrically insulating material, such as a polymer.

The mount terminals 76A and 76B can each be at least partially positioned within a corresponding one of the bosses 74-2A and 74-2B. For instance, the mount terminals 76A and 76B can be partially overmolded by material of the bosses 74-2A and 74-2B, or otherwise partly embedded in or recurred to the bosses 74-2A and 74-2B, such that a portion remains exposed to facilitate an electrical connection. The mount terminals 76A and 76B can each be made of an electrically conductive material, and can be threaded. Furthermore, electrical connection pads 76A-1 and 76B-1 can be provided along a face (e.g., inner face) of the base 74-1, to allow electrical connections to opposite ends 72A and 72B of the coil winding 72, such as through soldering or other suitable mechanisms (see FIGS. 3 and 8). The electrical connection pads 76A-1 and 76B-1 can be exposed portions of the mount terminals 74-2A and 74-2B, or, alternatively, can be separate pad structures electrically connected to the mount terminals 74-2A and 74-2B. In the illustrated embodiment, the mount terminals 76A and 76B are each female threaded bushings configured substantially identically to each other, and each protrude slightly beyond the corresponding bosses 74-2A and 74-2B. In the illustrated embodiment, the mount terminal bushings 76A and 76B are each able to simultaneously facilitate both mechanical (i.e., structural) and electrical connections, as explained further below. In further embodiments, the mount terminals 76A and 76B can utilize other types of threaded mechanisms, such as threaded studs and the like, or non-threaded engagement means, such as snap-fit mechanisms and the like.

When the tower mount 74 is assembled to the coil housing 70, the mount terminals 76A and 76B can extend into or through the corresponding openings 70-4A and 70-4B, while the corresponding bosses 74-2A and 74-2B can electrically isolate the mount terminals 76A and 76B from the wall 70W of the coil housing 70. The coil winding 72 (and its ends 72A and 72B) can remain entirely within the interior cavity 78 of the coil housing 70, while the mount terminals (e.g., bushings) 76A and 76B still allow electrical connections to be made from outside the coil housing 70 after the encapsulation material 80 has been applied over the coil winding 72. In embodiments where the mount terminals 76A and 76B are configured as threaded bushings, one advantage is the ability to concurrently make both mechanical and electrical connections between the coil sub-assembly 34C and the tower sub-assembly 34T using those bushings and one or more fasteners, which helps to simply fabrication and reduce fabrication time, while still providing robust electrical and structural engagements.

The tower sub-assembly 34T can include a tower housing 90, a circuit board 92 (e.g., a printed circuit board or PCB), a sensor element 94 (e.g., a Hall-effect sensor element), one or more tower terminals 96A and 96B (e.g., tower bushings), one or more fasteners 98A and 98B, and one or more connection cables 100.

The tower housing 90 includes an interior space 90-1 and an engagement surface 90-2. The tower housing 90 can be a substantially rigid structure made of a non-electrically conductive material, such as a polymer, and can be made by molding or other suitable processes. The interior space 90-1 can have any suitable shape so as to accommodate the circuit board 92 and associated wiring, plus any other additional desired components. The circuit board 92 (and the sensor element 94) can be encapsulated (e.g., potted) within the interior space 90-1 with encapsulation material 102 (e.g., potting material) adjacent to the circuit board 92. Encapsulation material 102 can protect the circuit board 92 within the tower housing 90 from environmental conditions and the like. The interior space 90-1 can be a closed space except for an opening 90-3 to allow one or more wires from the cable 100 to pass outside of the tower housing 90, so that such wires can be electrically connected to the circuit board 92 (or other components within the interior space 90-1) and to external components such as an engine control unit (ECU) and/or power supply 104. The individual wires of the cable 100 are shown only schematically in FIG. 4. The engagement surface 90-2 can be configured with a shape that is complementary to that of the exterior surface 70E of the coil housing 70 proximate the openings 70-4A and 70-4B, thereby facilitating engagement of the tower sub-assembly 34T with the coil sub-assembly 34C. In the illustrated embodiment, the engagement surface 90-2 is a bottom surface that is curved so as to follow a portion of a cylindrical surface. The tower housing 90 can optionally further include a tether mount 90-4 (or another suitable structure for rotationally fixing the electromagnetic coil assembly 34) and/or a sensor bump-out 90-5. As discussed further below, the tower housing 90 can further include one or more fastener passages 90-6A and 90-6B, and, optionally, corresponding caps 90-7A and 90-7B (shown only in FIG. 4, in an exploded depiction). The fastener passages 90-6A and 90-6B can pass entirely through the tower housing 90, such that the fastener passages 90-6A and 90-6B are open at opposite ends. A diameter of each of the fastener passages 90-6A and 90-6B should be at least as large as an outer diameter of the mount terminals 76A and 76B and/or the bosses 74-2A and 74-2A, such that the mount terminals 76A and 76B and/or the bosses 74-2A and 74-2A extend into the fastener passages 90-6A and 90-6B when the tower sub-assembly 34T and the coil sub-assembly 34C are engaged to each other.

The tower terminals 96A and 96B are each configured as non-threaded bushings in the illustrated embodiment, and are secured to the tower housing 90 at or along the respective fastener passages 90-6A and 90-6B. The tower terminals 96A and 96B can be overmolded by material of the tower housing 90 in some embodiments, thereby provided a secure and rotationally fixed engagement. The tower terminals 96A and 96B are each made of an electrically conductive material, and at least a portion of each tower terminal 96A and 96B is exposed to allow for an electrical connection to be made. In the illustrated embodiment, each tower terminal 96A and 96B has a ring-shaped portion with opposite top and bottom surfaces, which can each be substantially flat, and each of the top and bottom surfaces are exposed through the fastener passages 90-6A and 90-6B. The fasteners 98A and 98B each pass through an opening or cutout 96A-1 and 96B-1 in the respective tower terminals 96A and 96B. As shown in FIG. 4, for instance, the tower terminals 96A and 96B (e.g., the bottom surfaces thereof) physically contact exposed surfaces of the respective mount terminals 76A and 76B, creating an electrical connection therebetween. Washers or other electrically conductive components can optionally be positioned in between the tower terminals 96A and 96B and the respective mount terminals 76A and 76B in further embodiments, while still providing electrical connections. Alternatively, the tower terminals 96A and 96B can be spaced from the respective mount terminals 76A and 76B (i.e., not in direct physical contact), and an electrical connection between the tower terminals 96A and 96B and the respective mount terminals 76A and 76B can be indirectly formed through the fasteners 98A and 98B. The tower terminals 96A and 96B can each additional have leads 96A-2 and 96B-2, which can each extend away from the fasteners 98A and 98B and the mount terminals 76A and 76B and be electrically connected to the circuit board 92, or any other desired component (e.g., wires of the cable 100). The leads 96A-2 and 96B-2 can each be partially overmolded by material of the tower housing 90.

The fasteners 98A and 98B are each threaded bolts with a threaded shank 98A-1 and 98B-1 and a head 98A-2 and 98B-2, in the illustrated embodiment. As shown in FIG. 4, for instance, the fasteners 98A and 98B are each passed through the openings 96A-1 and 96B-1 of the tower terminals 96A and 96B, and threadably engaged with the mount terminals 76A and 76B. The fasteners 98A and 98B can be made of an electrically conductive material, and can be electrically connected to the tower terminals 96A and 96B and the mount terminals 76A and 76B, such as by physically contacting the tower terminals 96A and 96B and the mount terminals 76A and 76B. The optional caps 90-7A and 90-7B can be removably engaged with the tow housing 90 to cover the fastener passages 90-6A and 90-6B and help protect the fasteners 98A and 98B and the tower terminals 96A and 96B.

The fasteners 98A and 98B are tightened or otherwise secured to apply a compressive or clamping load on the tower terminals 96A and 96B and the mount terminals 76A and 76B along axes 106A and 106B, which can concurrently create both mechanical (i.e., structural) and electrical connections. The axes 106A and 106B can each be arranged to pass through the respective fastener passages 90-6A and 90-6B, the openings 96A-1 and 96B-1 (and/or other structures of the tower terminals 96A and 96B), the mount terminals 76A and 76B, the fasteners 98A and 98B, and the openings 70-4A and 70-4B in the wall 70W of the coil housing 70. In addition, or in the alternative, the axes 106A and 106B can each be arranged parallel to a radial line, and parallel to each other, but offset from such a radial line so as to not be purely radial. The fasteners 98A and 98B, when engaged and tightened, clamp the wall 70W of the coil housing 70 between the tower housing 90 and the base 74-1 of the tower mount 74, and concurrently create electrical connections between the tower terminals 96A and 96B and the mount terminals 76A and 76B. The base 74-1 is generally larger than either of the openings 70-4A and 70-4B in the coil housing 70, which facilitates the clamping action. Moreover, the fasteners 98A and 98B can compressively hold the tower terminals 96A and 96B against the mount terminals 76A and 76B, or can compress a stack of components in contact with each other, which can facilitate electrical connections therebetween. The fastener passages 90-6A and 90-6B allow access to install or remove the fasteners 98A and 98B from the exterior of the coil housing 70, meaning that access to the cavity 78 of the coil housing 70 is not required to secure the tower sub-assembly 34T to the coil subassembly 34C and electrically connect components of the tower sub-assembly 34T and the coil subassembly 34C. Once the electromagnetic coil assembly 34 is fully installed, an electrical circuit allows electrical power to flow from the connector cable(s) 100 through the circuit board 92, to one of the tower terminals 96A or 96B, an associated fastener 98A or 98B and mount terminal 76A or 76B, then through the coil winding 72 to another mount terminal 76A or 76B, fastener 98A or 98B and tower terminal 96A or 96B, then finally back to the circuit board 92 and electrical cable(s) 100, thus completing the electrical circuit.

In the illustrated embodiment, the mount terminals 76A and 76B and the fasteners 98A and 98B are each threaded to facilitate engagement, though alternative, non-threaded fasteners (e.g., snap-fit or "shark bite" mechanisms) can be utilized in other embodiments. Moreover, in alternative embodiments, the mount terminals 76A and 76B could be threaded studs and the fasteners 98A and 98B can be threaded nuts, with the tower terminals 96A and 96B being bushings placed over the threaded studs such that tightening the threaded nuts on the threaded studs electrically and mechanically (i.e., structurally) connects the tower bushings and the studs.

The sensor element 94 can be optionally provided, and can be electrically connected to the circuit board 92. In the illustrated embodiment, the sensor element is positioned in the sensor bump-out 90-5, which is open to the interior space 90-1. The sensor element 94 can be encapsulated with the encapsulation material 102, thereby protecting the sensor element 94. In order to allow for proper function of the electromagnetically-controlled viscous clutch 20, speed feedback from a sensor (e.g., a Hall-effect sensor) needs to be provided to the ECU 104 or other control unit; these functions are managed by a controller, which can be implemented as the circuit board 92 in the tower sub-assembly 34T. The sensor element 94 can be a Hall-effect element that interacts with a target on an output member (e.g., mounting disk 30) of the clutch 20. The general operation of Hall-effect sensors for viscous clutch speed sensing is well known. One advantage of the configuration shown in the illustrated embodiment is that the tower sub-assembly 34T can contain the sensor element 94 such that structural and electrical connections for the tower assembly 34T concurrently couple both the coil subassembly 34C and secure the sensor element 94 in position for operation. In that way, the cable(s) 100 operably connect the sensor element 94, the circuit board 92 and the coil winding 72 to the ECU 104, thereby reducing the number of electrical and mechanical connections that must be made.

Figure 10:
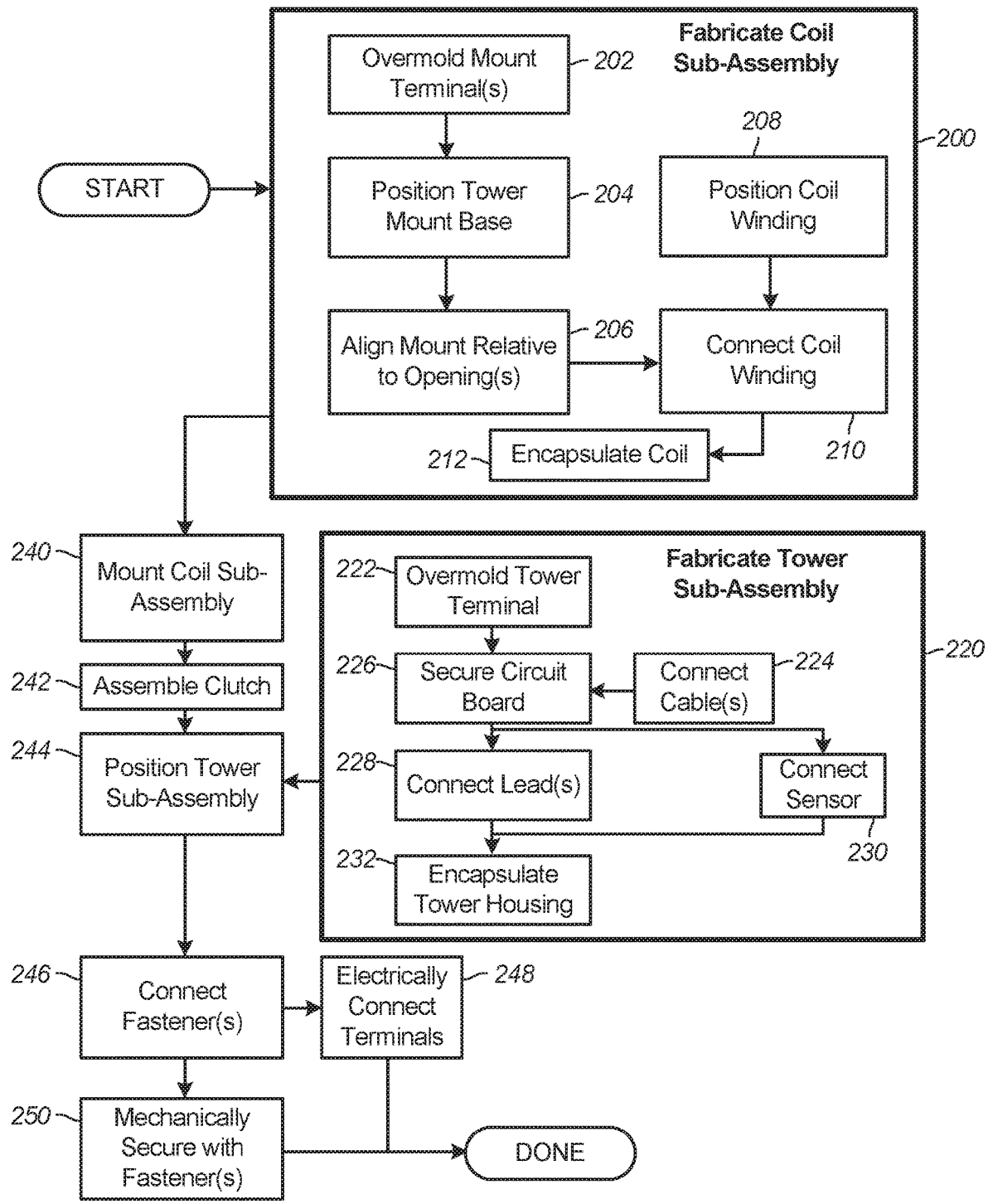
FIG. 10 is a flow chart of an embodiment of a method of manufacturing a clutch and associated electromagnetic coil assembly according to the present invention.

FIG. 10 is a flow chart of an embodiment of a method of manufacturing the clutch 20 and the electromagnetic coil assembly 34. To fabricate the coil sub-assembly 34C (step 200), the mount terminal(s) 76A and 76B can be overmolded with the tower mount 74 (step 202), or otherwise embedded or connected together. The tower mount 74 is then positioned with the base 74-1 within the cavity 78 of the coil housing 70, and is against or near the interior surface 70I (step 204). The boss(es) 74-2A and/or 74-2B and/or the mount terminal(s) 76A and/or 76B are aligned with the opening(s) 70-4A and/or 70-4B, and can further pass into or through the opening(s) 70-4A and/or 70-4B (step 206). Turns of the coil winding 72 are positioned in the cavity 78 of the coil housing 70 (step 208). It should be noted that the coil winding 72 can be positioned before or after the tower mount 74 is positioned, as desired. Once the base 74-1 is in between the turns of the coil winding 72 and the wall 70W of the coil housing 70, the end(s) 72A and/or 72B are electrically connected to the mount terminal(s) 76A and/or 76B (e.g., to electrical connection pads 76A-1 and 76B-1 thereof) (step 210), such as through soldering or another suitable process. The coil winding 72, and other components in the cavity 78, can then be encapsulated (step 212). The coil sub-assembly 34C can be encapsulated by potting, overmolding or other suitable encapsulation procedures, leaving at least the mount terminal(s) 76A and 76B exposed. Fabrication of the coil sub-assembly 34C can further include making the coil housing 70, which can include joining the inner and outer poles 70-1 and 70-2 of the coil housing 70, and mounting the bearing set 50 to the coil housing 70. It should be noted that additional steps not specifically mentioned can also be performed, and, except as specifically noted, steps can be performed in a different order than listed, including being performed simultaneously. Some steps, such as encapsulating the coil winding (step 212), can even be omitted in some embodiments.

To fabricate the tower sub-assembly 34T (step 220), the tower terminal(s) 96A and/or 96B can be overmolded in the tower housing 90 (step 222), or otherwise secured to or embedded in the tower housing 90. The circuit board can be connected to the wire(s) of the cable(s) (step 224), and can be placed in the interior space 90-1 of the tower housing 90 and secured there (step 226). The tower terminal lead(s) 96A-2 and/or 96B-2 are then electrically connected to the circuit board 92 (step 228), and the sensor element 94, if present, is also electrically connected to the circuit board 92 (step 230). The interior space 90-1 of the tower housing 90 can then be encapsulation (step 232). Encapsulation can effectively seal the circuit board 92 within the interior space 90-1 of the tower housing 90, blocking all openings to the interior space 90-1 with respect to the ambient environment. Potting can be utilized to provide encapsulation at step 232. In alternative embodiments, the interior space 90-1 can be sealed or otherwise protected in another suitable manner. It should be noted that additional steps not specifically mentioned can also be performed, and, except as specifically noted, steps can be performed in a different order than listed, including being performed simultaneously. Some steps, such as encapsulating the coil interior space (step 232), can even be omitted in some embodiments. The coil sub-assembly 34C and the tower sub-assembly 34T can be fabricated and kept in inventory in advance of the additional steps discussed below.

The electromagnetic coil assembly 34 can be completed and assembled with the rest of the clutch 20 by first mounting the coil sub-assembly 34C to the clutch 20 (step 240), such as by mounting the coil sub-assembly 34C on the shaft 22 with the bearing set 50. Additional components of the clutch 20 can then be assembled (step 242), such as by mounting the housing 24 and the rotor 26 (and related components) on the shaft 22. Next, the tower sub-assembly 34T can be positioned for engagement with the coil sub-assembly 34C (step 244). Step 244 can include positioning the tower housing 90 along the exterior surface 70E, at an opposite side of the wall 70W of the coil housing 70 from the base 74-1 of the tower mount 74. Step 244 can further include positioning the tower housing 90 such that the boss(es) 74-2A and/or 74-2B and/or the mount terminal(s) 76A and/or 76B extend into the fastener passage(s) 90-6A and/or 90-6B. Next, the fastener(s) 98A and/or 98B are engaged to connect the tower terminal(s) 96A and/or 96B to the mount terminal(s) 76A and/or 76B to connect the tower sub-assembly 34T and the coil sub-assembly 34C (step 246). Connecting the fastener(s) 98A and/or 98B can concurrently or simultaneously provide both a structural mechanical connection and an electrical connection through the opening(s) 70-4A and/or 70-4B in the wall 70W of the coil housing 70, which can include electrically connecting the tower terminal(s) 96A and/or 96B and the mount terminal(s) 76A and/or 76B (step 248) and mechanically securing the tower subassembly 34T to the coil sub-assembly 34C (e.g., by generating clamping force(s)) (step 250). The mechanical securing force(s) (e.g., clamping force(s)) can be generated along the axes 106A and/or 106B by tightening the fastener(s) 98A and/or 98B, such that mechanical forces and electrical currents are both transmitted through the opening(s) 70-4A and/or 70-4B. Additional clamping force can be applied to the wall 70W of the coil housing 70 by the tower housing 90 and the tower mount 74 (e.g., the base 74-1). The cap(s) 90-7A and/or 90-7B can be secured to the tower housing 90 after the fastener(s) 98A and/or 98B are engaged, to protect and conceal the fastener(s) 98A and/or 98B. Additional steps can include electrically connecting the wires of the cable(s) 100 to the ECU/power supply 104, as well as attaching a tether, strap, bracket or other fixing device to the coil assembly 34 (e.g., to the tether mount 90-4). It should be noted that additional steps not specifically mentioned can also be performed, and, except as specifically noted, steps can be performed in a different order than listed, including being performed simultaneously. Some steps, such as connecting a tether or attaching caps, can even be omitted in some embodiments.

The tower sub-assembly 34T can be removed from the coil sub-assembly 34C at a later time, such as to repair or replace the tower sub-assembly 34T while leaving the coil sub-assembly 34C in place.

Figure 11:
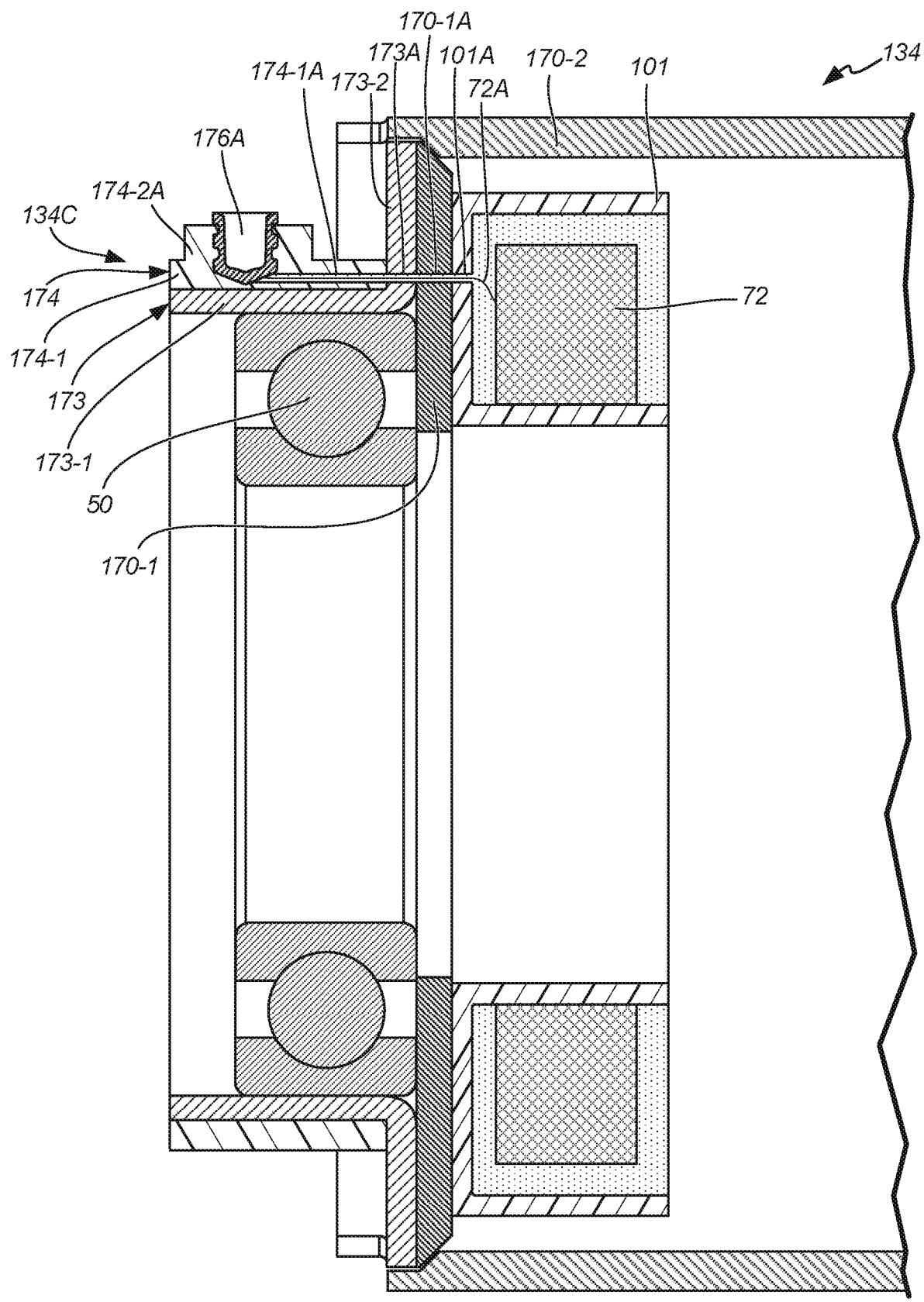
FIG. 11 is a cross sectional view of a portion of another embodiment of an electromagnetic coil assembly according to the present invention.

FIG. 11 is a cross sectional view of another embodiment of a coil sub-assembly 134C of an electromagnetic coil assembly 134. The coil sub-assembly 134C can be utilized with a tower sub-assembly (e.g., the tower sub-assembly 34T) and fasteners (e.g., the fasteners 98A and 98B), which are not shown in FIG. 11 for simplicity.

The coil sub-assembly 134C of the illustrated embodiment includes a coil winding 72, a bobbin 101, a first pole (or housing piece) 170-1, a second pole (or housing piece) 170-2, a bearing housing 173, and a tower mount 174. The coil winding 72 includes multiple turns positioned in the bobbin 101, which can be made of a non-electrically conductive material such as a molded polymer material. The coil winding 72 can be encapsulated (e.g., potted) in the bobbin 101. The first and second poles 170-1 and 170-2 are located adjacent to the bobbin 101 and the coil winding 72, with the bobbin 101 positioned in between the coil winding 72 and the first and second poles 170-1 and 170-2. As shown in FIG. 11, the first pole 170-1 is located axially adjacent to the bobbin 101 and is an annular member extending generally radially, while the second pole 170-2 is located radially adjacent to (and outward of) the bobbin 101 and is an annular member extending generally axially. The first and second poles 170-1 and 170-2 are each made of magnetic flux conductive material. Additional pole structures (not shown) can be provided to further create a flux circuit. The bobbin 101 and the coil winding 72 can be positioned at least partially within a cavity formed by at least the second pole 170-2.

The bearing housing 173 can be positioned adjacent to the first pole 170-1. In the illustrated embodiment, the bearing housing is positioned axially adjacent to the first pole 170-1 at an opposite side of the first pole 170-1 from the bobbin 101 and turns of the coil winding 72. The bearing housing 173 includes an annular axially extending portion 173-1, which can provide a bearing pilot at a radially inward facing surface to engage a coil being 50 that can rotatably support the coil assembly 134 on a shaft or other structure (not shown). The bearing housing 173 can further include a radially extending portion 173-2.

The tower mount 174 can include a base 174-1, which can be made from a polymer material and can be overmolded or otherwise supported on the axially extending portion 173-1 of the bearing housing 173. The base 174-1 can have a substantially annular shape, and can include one or more outwardly protruding bosses 174-2A (only one is visible in FIG. 11). At least one mount bushing 176A is supported by the base 174-1, and one mount bushing 176 can be provided on or in each boss 174-2 in a manner similar to that described above with respect to bushings 76A and 76B. As shown in the embodiment of FIG. 11, the base 174-1 is located axially adjacent to the coil winding 72, and outward of the coil bearing 50, at a location that overlaps the coil winding 72 in the radial direction. In further embodiments, the base 174-1 can be integrally and monolithically formed with the bobbin 101, or could be supported on (e.g., overmolded on) the second pole 170-2 or another suitable supporting structure.

An end 72A of the coil winding 72 is electrically connected to the mount bushing 176A. In order to make the electrical connection between the coil winding 72 and the mount bushing 176A, the end 72A can pass through respective openings 101A, 170-1A, 173A and 174-1A in the bobbin 101, the first pole 170-1, the bearing mount 173, and the base 174-1. Another end (not shown) of the coil winding can be connected to another mount bushing, with the other end passing through the same or different openings as the end 72A.

Those of ordinary skill in the art, after reviewing the entirety of the present disclosure, will appreciate that the present invention provides numerous benefits and advantages. For instance, the fabrication/assembly method of the present invention can involve fewer steps than prior art methods, and with relatively few soldering steps (if any). The tower sub-assembly can also still be disconnected and/or removed later in a relatively easy manner, as well as allowing for re-connection after disconnection and/or removal. Completing the electromagnetic coil assembly can also be done in stages. For instance, the coil housing assembly can be assembled early in the fabrication process. The incomplete clutch assembly can move through a production facility, such as along an assembly line, without the tower sub-assembly and therefore without the need to accommodate long wires and/or connectors associated with the tower sub-assembly. This allows easier handling during clutch assembly/fabrication processes. The tower sub-assembly can then be assembled to the coil sub-assembly relatively late in the overall clutch assembly fabrication process.

Furthermore, the mechanical (i.e., structural) and electrical connections can be achieved through the same components, namely the tower terminals (e.g., bushings), the fasteners and the mount terminals (e.g., bushings). Stated another way, multi-function components can be utilized that simultaneously provide electrical and mechanical (i.e., structural) connections. In one embodiment, the mechanical connection of the tower housing, which holds the circuit board and connection cable(s), to the coil sub-assembly can be achieved by securing the fasteners through the tower bushings and into the threaded tower mount bushings, which engage the tower mount positioned inside the coil housing outer pole. The tower mount can include a body portion that links the mount terminals/bushings, and allows the fasteners to create a clamping force on the wall (e.g., at the outer pole) of the coil housing, in between the tower mount and the tower housing. The body of the tower mount can be arcuate in shape, to follow a curvature of the outer pole and to avoid interfering with the coil winding and to maintain a relatively small size and mass. In some embodiments, the coil sub-assembly can have only the female mount bushings exposed, without any external wires or cables, which can be present exclusively on the tower sub-assembly.

For a large number of possible applications, the combination of coil voltages (12V, 24V), cable length and connector types would normally require a new part number for each version of a prior art coil assembly (without a detachable tower sub-assembly). With the presently-disclosed two-part coil assembly there are only two coil sub-assemblies (12v, 24V) that have to be stocked. The tower sub-assembly can be customized with cable length, tether version and connector type independently of the coil sub-assembly, and can be attached to the fan clutch at or near the end of the assembly process (meaning the desired combination of components need not be pre-determined).

Because the mechanical tether and the electrical connection (cable and connector) are typically located at an exposed location between the fan clutch and an engine, in a typical installation, these parts have higher risk of being damaged and cause the complete fan clutch assembly to fail. With an integral coil assembly, according to the prior art, such a tether and/or electrical connection failure means the complete fan clutch needs to be replaced. In contrast, the detachable tower sub-assembly, if damaged, can be removed and replaced with a new one in the field while the fan clutch itself can stay in place.

While electromagnetic coil assemblies with detachable tower units are known, they require some kind of separate electrical connection, generally using standard electrical connectors, pins and bushings that are separate from mechanical connectors. These separate electrical connectors have the risk of degrading and failing due to the harsh conditions (temperatures, vibrations) the fan clutch is setting. Using the mechanical mounting through bushings and screws according to embodiments of the present invention, for instance, omits the separate electrical connectors and uses the highly reliable mechanical connection for transferring the electrical current. Such electromechanical connections as presently disclosed can also be protected from the ambient environment with caps, covers of the like.

Discussion of Possible Embodiments

An electromagnetic coil assembly can include a coil sub-assembly and a housing sub-assembly. The coil sub-assembly can include a coil housing having a first opening and made of a magnetic flux conducting material, a coil winding having multiple turns positioned adjacent to the coil housing, a tower mount having a base adjoining the first opening and extending along a first surface of the coil housing, and a first mount bushing secured to the base and made of an electrically conductive material. The first mount bushing is electrically isolated from the coil housing, and the first mount bushing is electrically connected to the coil winding. The tower sub-assembly can include a tower housing positioned at a second surface of the coil housing, with the second surface located opposite the first surface, a first tower bushing electrically connected to the first mount bushing, and a first fastener securing the first tower bushing to the first mount bushing. The first fastener is engageable to the first mount bushing from proximate the second surface of the coil housing.

The assembly of the preceding paragraph can optionally include, additionally and/or alternatively, any one or more of the following features, configurations and/or additional components:

a circuit board located in an interior space of the tower housing and electrically connected to the first tower bushing; and a wire electrically connected to the circuit board and extending out of the tower housing;

the circuit board can be encapsulated within the interior space of the tower housing;

the tower housing can further include a first fastener passage located adjacent to the interior space, and the first fastener passage can be configured to provide access to the first fastener;

a Hall effect sensor element located at least partially within the tower housing;

the Hall effect sensor can be electrically connected to the circuit board;

the tower mount can further include a first boss that protrudes from the base;

the first mount bushing can be positioned at least partially within the first boss;

the first boss can pass through the first opening of the coil housing;

the first tower bushing can directly physically contact the first mount bushing;

the first fastener can compressively hold the first tower bushing against the first mount bushing;

the first mount bushing can be a threaded female bushing;

the first fastener can be a threaded fastener having a shank that passes through the first tower bushing and can further have a head located at an opposite side of the first tower bushing than the first mount bushing;

the first tower bushing can have a lead that extends away from the first mount bushing;

the coil housing can include an inner pole having a ring-shaped axially extending portion and a radially extending portion; and an outer pole having a ring-shaped axially extending portion and a radially extending portion;

the respective radially extending portions of the inner and outer poles can be secured to each other, and the respective axially extending portions of the inner and outer poles can be spaced from each other;

the coil housing can have a cup-like shape;

the coil winding can be at least partially encapsulated in the coil housing;

a second mount bushing secured to the base, the second mount bushing made of an electrically conductive material;

the second mount bushing can be electrically isolated from the coil housing, and can be electrically connected to the coil winding at an opposite end from the first mount bushing;

a second tower bushing electrically connected to the second mount bushing;

the first fastener can clamp a wall of the coil housing between the tower housing and the base of the tower mount; and/or at least one of the first mount bushing and the first fastener can pass through the first opening in the coil housing.

A viscous clutch assembly including an input member, an output member, a working chamber defined between the input member and the output member, a reservoir to hold a supply of a shear fluid, the reservoir fluidically connected to the working chamber by a fluid circuit, and a valve configured to control flow of the shear fluid along the fluid circuit. The viscous clutch assembly can further include an electromagnetic coil assembly with a coil sub-assembly and a tower sub-assembly. The coil sub-assembly can include a coil housing having a cavity and a first opening, with the coil housing being made of a magnetic flux conducting material, a coil winding having multiple turns positioned within the cavity of the coil housing, a tower mount having a base positioned in the cavity adjoining the first opening and extending along an interior surface of the coil housing, and a first mount bushing secured to the base. The first mount bushing can be made of an electrically conductive material. The first mount bushing can be electrically isolated from the coil housing and electrically connected to the coil winding. The tower sub-assembly can include a tower housing positioned at an exterior of the coil housing, a first tower bushing electrically connected to the first mount bushing, and a first fastener securing the first tower bushing to the first mount bushing. The first fastener can be configured to be engageable to the first mount bushing from the exterior of the coil housing. Operation of the valve can be electromagnetically controlled by magnetic flux generated by the electromagnetic coil assembly.

The viscous clutch assembly of the preceding paragraph can optionally include, additionally and/or alternatively, any one or more of the features, configurations and/or additional components described above.

A method can include positioning turns of a coil winding in a cavity of a coil housing; positioning a base of a tower mount within the cavity of the coil housing such that the base is in between the turns of the coil winding and a wall of the coil housing; aligning a mount terminal with an opening in the wall of the coil housing, such that the mount terminal is secured to the base; electrically connecting the mount terminal to the coil winding; positioning a tower housing at an opposite side of the wall of the coil housing from the base of the tower mount, where the tower housing carries a tower terminal; and connecting the tower terminal to the mount terminal with a fastener. Connecting the fastener can provide both a structural mechanical connection and an electrical connection through the opening in the wall of the coil housing.

The method of the preceding paragraph can optionally include, additionally and/or alternatively, any one or more of the following features, configurations and/or additional steps:

encapsulating a circuit board within an interior space in the tower housing;

electrically connecting a lead from the tower terminal to the circuit board;

electrically connecting at least one electrical cable to the circuit board, with the electrical cable extending outside the tower housing;

encapsulating the coil winding in the coil housing;

generating a clamping force with the fastener along an axis that passes through the opening in the wall of the coil housing;

overmolding the base of the tower mount on the mount terminal;

overmolding the tower housing on the tower terminal;

mounting the coil housing on a shaft of a viscous clutch; and/or the step of mounting the coil housing on the shaft of the viscous clutch can occur before positioning the tower housing at the opposite side of the wall of the coil housing from the base of the tower mount, and before connecting the tower terminal to the mount terminal with the fastener, but after positioning turns of the coil winding in a cavity of the coil housing, after positioning the base of the tower mount within the cavity of the coil housing, after aligning the mount terminal with the opening in the wall of the coil housing, and after electrically connecting the mount terminal to the coil winding.

An electromagnetic coil assembly can include a coil sub-assembly and a tow sub-assembly removably connected to the coil sub-assembly. The coil sub-assembly can include: a coil housing having a cup-shaped wall that defines a cavity inside the coil housing, an opening can extend through the wall, and the wall of the coil housing can be made of a magnetic flux conducting material; a coil winding having multiple turns positioned within the cavity of the coil housing; a tower mount having a base and a boss, the base positioned in the cavity adjoining the opening and extending along an interior surface of the wall of the coil housing, and the boss protruding from the base and through the opening; and a mount terminal secured to the base, the mount terminal can be made of an electrically conductive material, the mount terminal can be electrically isolated from the coil housing by the boss, and the mount terminal can be electrically connected to the coil winding. The tower sub-assembly can include: a tower housing positioned at an exterior of the coil housing and extending along an exterior surface of the wall of the coil housing; a tower terminal electrically connected to the mount terminal; and a fastener securing the coil sub-assembly to the tower sub-assembly. The fastener can clamp the wall of the coil housing between the tower housing and the base of the tower mount and create an electrical connection between the tower terminal and the mount terminal.

The assembly of the preceding paragraph can optionally include, additionally and/or alternatively, any one or more of the following features, configurations and/or additional components:

a circuit board enclosed within an interior space of the tower housing and electrically connected to the tower terminal; and a wire electrically connected to the circuit board and extending out of the tower housing.

An electromagnetic coil assembly can include a coil sub-assembly and a tower sub-assembly. The coil sub-assembly can include a coil housing having a cavity and a first opening, with the coil housing being made of a magnetic flux conducting material, a coil winding having multiple turns positioned within the cavity of the coil housing, a tower mount having a base positioned in the cavity adjoining the first opening and extending along an interior surface of the coil housing, and a first mount bushing secured to the base. The first mount bushing can be made of an electrically conductive material. The first mount bushing can be electrically isolated from the coil housing and electrically connected to the coil winding. The tower sub-assembly can include a tower housing positioned at an exterior of the coil housing, a first tower bushing electrically connected to the first mount bushing, and a first fastener securing the first tower bushing to the first mount bushing. The first fastener can be configured to be engageable to the first mount bushing from the exterior of the coil housing.

A method can include positioning a base of a tower mount at a first side of a coil pole, wherein turns of a coil winding are located adjacent to the coil pole; aligning a mount terminal with an opening in the coil pole, such that the mount terminal is secured to the base and the mount terminal is electrically connected to the coil winding; positioning a tower housing carrying a tower terminal at a second side of the coil pole, the second side located opposite the first side; and connecting the tower terminal to the mount terminal with a fastener. Connecting the fastener provides both a structural mechanical connection and an electrical connection through the opening in the coil pole.

The method of the preceding paragraph can optionally include, additionally and/or alternatively, any one or more of the following features, configurations and/or additional steps:

electrically connecting a circuit board to the tower terminal;

the circuit board can be located within the tower housing;

electrically connecting a sensor element to the circuit board, the sensor element carried by the tower housing; and/or mounting the coil pole on a shaft of a viscous clutch before positioning the tower housing at the second side of the coil pole, and before connecting the tower terminal to the mount terminal with the fastener, but after positioning the base of the tower mount at the first side of the coil pole, and after aligning the mount terminal with the opening in the coil pole.

An electromagnetic coil assembly can include a coil winding forming multiple turns, a molded base having an annular shape and positioned adjacent to the coil winding, a mount bushing made of an electrically conductive material and secured to the molded base with the coil winding electrically connected to the base bushing, a tower housing positioned adjacent to the molded base, a tower bushing secured to the tower housing, and a fastener electrically connecting the tower bushing to the mount bushing, wherein the fastener further mechanically secures the tower housing to the molded base.

The assembly of the preceding paragraph can optionally include, additionally and/or alternatively, any one or more of the following features, configurations and/or additional components:

a bobbin made of a non-electrically conductive material;

at some of the multiple turns of the coil winding can be positioned within the bobbin;

a coil pole made of a magnetic flux-conductive material can be positioned adjacent to the coil winding and the bobbin;

the coil pole can have an opening, and the mount bushing can be electrically connected to the coil winding through the opening;

a bearing housing positioned adjacent to the coil pole;

the bearing housing can have a bearing housing opening, and the mount bushing can be electrically connected to the coil winding through the bearing housing opening;

the bearing housing can include an axially-extending portion located at an opposite side of the coil pole from the bobbin;

a bearing pilot can be provided at a radially inward-facing side of the axially-extending portion, and wherein the molded base is positioned on a radially outward-facing side of the axially-extending portion;

the fastener can be a threaded fastener, and the threaded fastener can threadably engage the mount bushing.

the mount bushing can include a radially outwardly facing mount bushing opening, the tower busing can include a tower bushing opening; and/or the fastener can extend substantially radially through the tower bushing opening and into the mount bushing opening.

A method of making an electromagnetic coil assembly can include securing a mount bushing to a base made of a polymer material, the base having an annular shape and the mount bushing being electrically conductive; positioning the base adjacent to turns of a coil winding; electrically connecting the coil winding to the mount bushing; securing a tower bushing to a tower housing, the tower bushing being electrically conductive; positioning a tower housing adjacent to a radially outward facing surface of the base; and connecting the tower bushing to the mount bushing with a fastener. Connecting the fastener can create both (a) a structural mechanical connection that supports the tower housing on the base and (b) an electrical connection between the mount bushing and the tower bushing.

The method of the preceding paragraph can optionally include, additionally and/or alternatively, any one or more of the following features, configurations and/or additional steps:

electrically connecting the coil winding to an additional mount bushing secured to the base;

connecting the additional mount bushing to an additional tower bushing with an additional fastener, the additional tower bushing secured to the tower housing;

connecting the additional fastener can create both (a) an additional structural mechanical connection that supports the tower housing on the base and (b) an additional electrical connection between the additional mount bushing and the additional tower bushing;

the tower housing can be secured to the base exclusively with the fastener and the additional fastener, such that the fastener and the additional fastener provide the only structural mechanical connections supporting the tower housing on the base; and/or passing end portions of the coil winding through at least one opening in a coil pole positioned in between the turns of the coil winding and the base, the coil pole made of a magnetic flux conducting material.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, transitory signal/current/power fluctuations, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention.

The invention claimed is:

1. An electromagnetic coil assembly comprising:
   a coil sub-assembly comprising:
      a coil housing having a first opening, wherein the coil housing is made of a magnetic flux conducting material;
      a coil winding having multiple turns positioned adjacent to the coil housing;
      a tower mount having a base adjoining the first opening and extending along a first surface of the coil housing; and
      a first mount bushing secured to the base, the first mount bushing made of an electrically conductive material, wherein the first mount bushing is electrically isolated from the coil housing, and wherein the first mount bushing is electrically connected to the coil winding; and
   a tower sub-assembly comprising:
      a tower housing positioned at a second surface of the coil housing, wherein the second surface is located opposite the first surface;
      a first tower bushing electrically connected to the first mount bushing; and a first fastener securing the first tower bushing to the first mount bushing, wherein the first fastener is engageable to the first mount bushing from proximate the second surface of the coil housing.

2. The assembly of claim 1 and further comprising:
a circuit board located in an interior space of the tower housing and electrically connected to the first tower bushing; and
a wire electrically connected to the circuit board and extending out of the tower housing.

3. The assembly of claim 2, wherein the circuit board is encapsulated within the interior space of the tower housing.

4. The assembly of claim 2, wherein the tower housing further includes a first fastener passage located adjacent to the interior space, wherein the first fastener passage is configured to provide access to the first fastener.

5. The assembly of claim 2 and further comprising:
a Hall effect sensor element located at least partially within the tower housing.

6. The assembly of claim 1, wherein the tower mount further includes a first boss that protrudes from the base, wherein the first mount bushing is positioned at least partially within the first boss, and wherein the first boss passes through the first opening of the coil housing.

7. The assembly of claim 1, wherein the first tower bushing directly physically contacts the first mount bushing, and wherein the first fastener compressively holds the first tower bushing against the first mount bushing.

8. The assembly of claim 1, wherein the first mount bushing is a threaded female bushing, and wherein the first fastener is a threaded fastener having a shank that passes through the first tower bushing and further having a head located at an opposite side of the first tower bushing than the first mount bushing, and wherein the first tower bushing has a lead that extends away from the first mount bushing.

9. The assembly of claim 1, wherein the coil housing comprises:
an inner pole having a ring-shaped axially extending portion and a radially extending portion; and
an outer pole having a ring-shaped axially extending portion and a radially extending portion, wherein the respective radially extending portions of the inner and outer poles are secured to each other, and wherein the respective axially extending portions of the inner and outer poles are spaced from each other.

10. The assembly of claim 1, wherein the coil housing has a cup-like shape, and wherein the coil winding is at least partially encapsulated in the coil housing.

11. The assembly of claim 1 and further comprising:
a second mount bushing secured to the base, the second mount bushing made of an electrically conductive material, wherein the second mount bushing is electrically isolated from the coil housing, and wherein the second mount bushing is electrically connected to the coil winding at an opposite end from the first mount bushing; and
a second tower bushing electrically connected to the second mount bushing.

12. The assembly of claim 1, wherein the first fastener clamps a wall of the coil housing between the tower housing and the base of the tower mount, and wherein at least one of the first mount bushing and the first fastener passes through the first opening in the coil housing.

13. A viscous clutch assembly including an input member, an output member, a working chamber defined between the input member and the output member, a reservoir to hold a supply of a shear fluid, the reservoir fluidically connected to the working chamber by a fluid circuit, and a valve configured to control flow of the shear fluid along the fluid circuit, the viscous clutch assembly further comprising:
the electromagnetic coil assembly of claim 1, wherein operation of the valve is electromagnetically controlled by magnetic flux generated by the electromagnetic coil assembly.

14. An electromagnetic coil assembly comprising:
a coil sub-assembly, comprising:
a coil housing having a cup-shaped wall that defines a cavity inside the coil housing, wherein an opening extends through the wall, and wherein the wall of the coil housing is made of a magnetic flux conducting material;
a coil winding having multiple turns positioned within the cavity of the coil housing;
a tower mount having a base and a boss, the base positioned in the cavity adjoining the opening and extending along an interior surface of the wall of the coil housing, and the boss protruding from the base and through the opening; and
a mount terminal secured to the base, the mount terminal made of an electrically conductive material, wherein the mount terminal is electrically isolated from the coil housing by the boss, and wherein the mount terminal is electrically connected to the coil winding; and
a tower sub-assembly removably connected to the coil sub-assembly, the tower sub-assembly comprising:
a tower housing positioned at an exterior of the coil housing and extending along an exterior surface of the wall of the coil housing;
a tower terminal electrically connected to the mount terminal; and
a fastener securing the coil sub-assembly to the tower sub-assembly, wherein the fastener clamps the wall of the coil housing between the tower housing and the base of the tower mount and creates an electrical connection between the tower terminal and the mount terminal.

15. The assembly of claim 14 and further comprising:
a circuit board enclosed within an interior space of the tower housing and electrically connected to the tower terminal; and
a wire electrically connected to the circuit board and extending out of the tower housing.

16. An electromagnetic coil assembly comprising:
a coil winding forming multiple turns;
a molded base having an annular shape, the molded base positioned adjacent to the coil winding;
a mount bushing made of an electrically conductive material and secured to the molded base, wherein the coil winding is electrically connected to the mount bushing;
a tower housing positioned adjacent to the molded base;
a tower bushing secured to the tower housing; and
a fastener electrically connecting the tower bushing to the mount bushing, wherein the fastener further mechanically secures the tower housing to the molded base.

17. The assembly of claim 16 and further comprising:
a bobbin made of a non-electrically conductive material, wherein at least some of the multiple turns of the coil winding are positioned within the bobbin; and
a coil pole made of a magnetic flux-conductive material positioned adjacent to the coil winding and the bobbin, wherein the coil pole has an opening, and wherein the mount bushing is electrically connected to the coil winding through the opening.

18. The assembly of claim 17 and further comprising:
a bearing housing positioned adjacent to the coil pole, the bearing housing having a bearing housing opening, wherein the mount bushing is electrically connected to the coil winding through the bearing housing opening.

19. The assembly of claim 18, wherein the bearing housing includes an axially-extending portion located at an opposite side of the coil pole from the bobbin, wherein a bearing pilot is provided at a radially inward-facing side of the axially-extending portion, and wherein the molded base is positioned on a radially outward-facing side of the axially-extending portion.

20. The assembly of claim 16, wherein the fastener is a threaded fastener, and wherein the threaded fastener threadably engages the mount bushing.

21. The assembly of claim 16, wherein the mount bushing includes a radially outwardly facing mount bushing opening, wherein the tower busing includes a tower bushing opening, and wherein the fastener extends substantially radially through the tower bushing opening and into the mount bushing opening.

\* \* \* \* \*

UNITED STATES PATENT AND TRADEMARK OFFICE
CERTIFICATE OF CORRECTION

PATENT NO. : 10,839,999 B2
APPLICATION NO. : 16/479008
DATED : November 17, 2020
INVENTOR(S) : Robert Donald Cayton and Bastian Michael Horst Brand It is certified that error appears in the above-identified patent and that said Letters Patent is hereby corrected as shown below:

In the Specification

In Column 10, Line 10:
Please delete "recurred"
And insert --secured--

In the Claims

In Claim 21, Column 25, Line 20:
Please delete "busing"
And insert --bushing--

Signed and Sealed this
Twenty-eighth Day of February, 2023

Katherine Kelly Vidal
*Director of the United States Patent and Trademark Office*